United States Patent
Fouda

(10) Patent No.: US 12,271,439 B2
(45) Date of Patent: Apr. 8, 2025

(54) FLEXIBLE COMPUTE ENGINE MICROARCHITECTURE

(71) Applicant: Rain Neuromorphics Inc., San Francisco, CA (US)

(72) Inventor: Mohammed Elneanaei Abdelmoneem Fouda, Irvine, CA (US)

(73) Assignee: Rain Neuromorphics Inc.

( * ) Notice: Subject to any disclaimer, the term of this patent is extended or adjusted under 35 U.S.C. 154(b) by 0 days.

(21) Appl. No.: 18/750,830

(22) Filed: Jun. 21, 2024

(65) Prior Publication Data

US 2024/0427844 A1    Dec. 26, 2024

Related U.S. Application Data

(60) Provisional application No. 63/523,003, filed on Jun. 23, 2023.

(51) Int. Cl.
　　*G06F 17/16*　　(2006.01)
　　*G06F 5/01*　　(2006.01)

(52) U.S. Cl.
　　CPC ............ *G06F 17/16* (2013.01); *G06F 5/01* (2013.01)

(58) Field of Classification Search
　　CPC ............ G06F 7/16; G06F 7/5443; G06F 7/523–5338; G06F 7/4824;
(Continued)

(56) References Cited

U.S. PATENT DOCUMENTS

| | | |
|---|---|---|
| 11,347,477 B2 | 5/2022 | Sumbul |
| 2009/0177867 A1 | 7/2009 | Garde |

(Continued)

FOREIGN PATENT DOCUMENTS

| | | |
|---|---|---|
| WO | 2020190776 | 9/2020 |
| WO | 2022029026 | 2/2022 |

OTHER PUBLICATIONS

H. Mori et al., "A 4nm 6163-TOPS/W/b 4790-TOPS/mm2/b SRAM Based Digital-Computing-in-Memory Macro Supporting Bit-Width Flexibility and Simultaneous MAC and Weight Update," 2023 ISSCC, San Francisco, CA, USA, Feb. 2023, pp. 132-134, doi: 10.1109/ISSCC42615.2023.10067555. (Year: 2023).*

(Continued)

*Primary Examiner* — Andrew Caldwell
*Assistant Examiner* — Carlo Waje
(74) *Attorney, Agent, or Firm* — Van Pelt, Yi & James LLP

(57) ABSTRACT

A compute engine is described. The compute engine includes compute-in-memory (CIM) modules and may include an input buffer coupled with the CIM modules. The input buffer stores a vector. The CIM modules store weights corresponding to a matrix and perform a vector-matrix multiplication (VMM) for the matrix and the vector. The CIM modules further include storage cells and vector multiplication units (VMUs) coupled with the storage cell and, if present, the input buffer. The storage cells store the weights. The VMUs multiply, with the vector, at least a portion of each weight of a portion of the plurality of weights corresponding to a portion of the matrix. A set of VMUs performs multiplications for a first weight length and a second weight length different from the first weight length such that each VMU of the set performs multiplications for both the first weight length and the second weight length.

16 Claims, 11 Drawing Sheets

(58) Field of Classification Search
CPC ...... G06F 2207/3816; G06F 2207/382; G06N 3/06; G06N 3/063; G11C 11/54
See application file for complete search history.

(56) References Cited

U.S. PATENT DOCUMENTS

| | | |
|---|---|---|
| 2010/0174883 A1 | 7/2010 | Lerner |
| 2015/0106311 A1 | 4/2015 | Birdwell |
| 2018/0189631 A1 | 7/2018 | Sumbul |
| 2019/0179795 A1 | 6/2019 | Huang |
| 2019/0205741 A1 | 7/2019 | Gupta |
| 2019/0340486 A1 | 11/2019 | Mills |
| 2019/0348110 A1 | 11/2019 | Sinangil |
| 2019/0362227 A1 | 11/2019 | Seshadri |
| 2020/0057938 A1* | 2/2020 | Lu .......................... G06F 17/16 |
| 2020/0207656 A1 | 7/2020 | Yoshioka |
| 2020/0293284 A1 | 9/2020 | Vantrease |
| 2020/0320403 A1 | 10/2020 | Daga |
| 2020/0410337 A1 | 12/2020 | Huang |
| 2021/0097431 A1 | 4/2021 | Olgiati |
| 2021/0158132 A1 | 5/2021 | Huynh |
| 2021/0224185 A1 | 7/2021 | Zhou |
| 2022/0004497 A1 | 1/2022 | Willcock |
| 2022/0019880 A1 | 1/2022 | Dasgupta |
| 2022/0114270 A1 | 4/2022 | Wang |
| 2022/0138286 A1 | 5/2022 | Zage |
| 2022/0164916 A1 | 5/2022 | Nurvitadhi |
| 2022/0207293 A1 | 6/2022 | Yao |
| 2022/0207656 A1 | 6/2022 | Yao |
| 2022/0244916 A1* | 8/2022 | Lee ........................ G11C 11/419 |
| 2022/0414432 A1 | 12/2022 | Banitalebi Dehkordi |
| 2023/0014565 A1 | 1/2023 | Ray |
| 2023/0047364 A1* | 2/2023 | Badaroglu ............ G06F 7/5443 |
| 2023/0074229 A1 | 3/2023 | Jia |
| 2023/0138695 A1 | 5/2023 | Kumar |
| 2023/0146647 A1 | 5/2023 | Byeon |
| 2023/0206044 A1* | 6/2023 | Ma .......................... G06N 3/063 706/15 |
| 2023/0259456 A1 | 8/2023 | Verma |
| 2023/0297580 A1 | 9/2023 | Sheng |
| 2023/0316060 A1 | 10/2023 | Jain |
| 2023/0359894 A1 | 11/2023 | Kim |
| 2024/0094986 A1* | 3/2024 | Lyubomirsky ...... G06F 7/49915 |
| 2024/0134606 A1* | 4/2024 | Yi .......................... G06F 7/5443 |
| 2024/0169201 A1* | 5/2024 | Seok ........................ G06N 3/04 |

OTHER PUBLICATIONS

K. Li et al., "A Precision-Scalable Energy-Efficient Bit-Split-and-Combination Vector Systolic Accelerator for NAS-Optimized DNNs on Edge," 2022 Design, Automation & Test in Europe Conference & Exhibition (DATE), Antwerp, Belgium, 2022, pp. 730-735, doi: 10.23919/DATE54114.2022.9774679 (Year: 2022).*

Y.-D. Chih et al., "16.4 An 89TOPS/W and 16.3TOPS/mm2 All-Digital SRAM-Based Full-Precision Compute-In Memory Macro in 22nm for Machine-Learning Edge Applications," 2021 ISSCC, San Francisco, CA, USA, 2021, pp. 252-254, doi: 10.1109/ISSCC42613.2021.9365766. (Year: 2021).*

Kim et al., Moneta: A Processing-In-Memory-Based Hardware Platform for the Hybrid Convolutional Spiking Neural Network with Online Learning, Frontiers in Neuroscience, vol. 16, Apr. 11, 2022.

Korthikanti et al., Reducing Activation Recomputation in Large Transformer Models, May 10, 2022, pp. 1-17.

Lee et al., A 12nm 121-TOPS/W 41.6-TOPS/mm2 All Digital Full Precision SRAM-based Compute-in-Memory with Configurable Bit-width for AI Edge Applications, 2022 Symposium on VLSI Technology & Circuits Digest of Technical Papers, pp. 24-25.

Song et al., PipeLayer: A Pipelined ReRAM-Based Accelerator for Deep Learning, 2017.

Lin et al., A Novel Voltage-Accumulation Vector-Matrix Multiplication Architecture using Resistor-Shunted Floating Gate Flash Memory Device for Low-Power and High-Density Neural Network Applications, 2018 IEEE International. Electron Devices Meeting (IEDM), Dec. 5, 2018, 4 pages.

* cited by examiner

FLEXIBLE COMPUTE ENGINE MICROARCHITECTURE

CROSS REFERENCE TO OTHER APPLICATIONS

This application claims priority to U.S. Provisional Patent Application No. 63/523,003 entitled COMPUTE ENGINE MICROARCHITECTURE filed Jun. 23, 2023 which is incorporated herein by reference for all purposes.

BACKGROUND OF THE INVENTION

Artificial intelligence (AI), or machine learning, utilizes learning networks loosely inspired by the brain in order to solve problems. Learning networks typically include layers of weights that weight signals (mimicking synapses) combined with activation layers that apply functions to the signals (mimicking neurons). The weight layers are typically interleaved with the activation layers. In the forward, or inference, path, an input signal is propagated through the learning network. In so doing, A weight layer can be considered to multiply input signals (the "activation" for that weight layer) by the weights stored therein and provide corresponding output signals. For example, the weights may be analog resistances or stored digital values that are multiplied by the input current, voltage or bit signals. The weight layer provides weighted input signals to the next activation layer, if any. Neurons in the activation layer operate on the weighted input signals by applying some activation function (e.g. ReLU or Softmax) and provide output signals corresponding to the statuses of the neurons. The output signals from the activation layer are provided as input signals (i.e. the activation) to the next weight layer, if any. This process may be repeated for the layers of the network, providing output signals that are the resultant of the inference. Learning networks are thus able to reduce complex problems to a set of weights and the applied activation functions. The structure of the network (e.g. the number of and connectivity between layers, the dimensionality of the layers, the type of activation function applied), including the value of the weights, is known as the model.

Although a learning network is capable of solving challenging problems, the computations involved in using such a network are often time consuming. For example, a learning network may use millions of parameters (e.g. weights), which are multiplied by the activations to utilize the learning network. Learning networks can leverage hardware, such as graphics processing units (GPUs) and/or AI accelerators, which perform operations usable in machine learning in parallel. Such tools can improve the speed and efficiency with which data-heavy and other tasks can be accomplished by the learning network. However, efficiency of such tools may still be less than desired, particularly for larger numbers of parameters. Further, the hardware tools may not be sufficiently flexible to adequately manage different types of parameters in the model. Consequently, improvements are desired.

BRIEF DESCRIPTION OF THE DRAWINGS

Various embodiments of the invention are disclosed in the following detailed description and the accompanying drawings.

DETAILED DESCRIPTION

Figure 1:
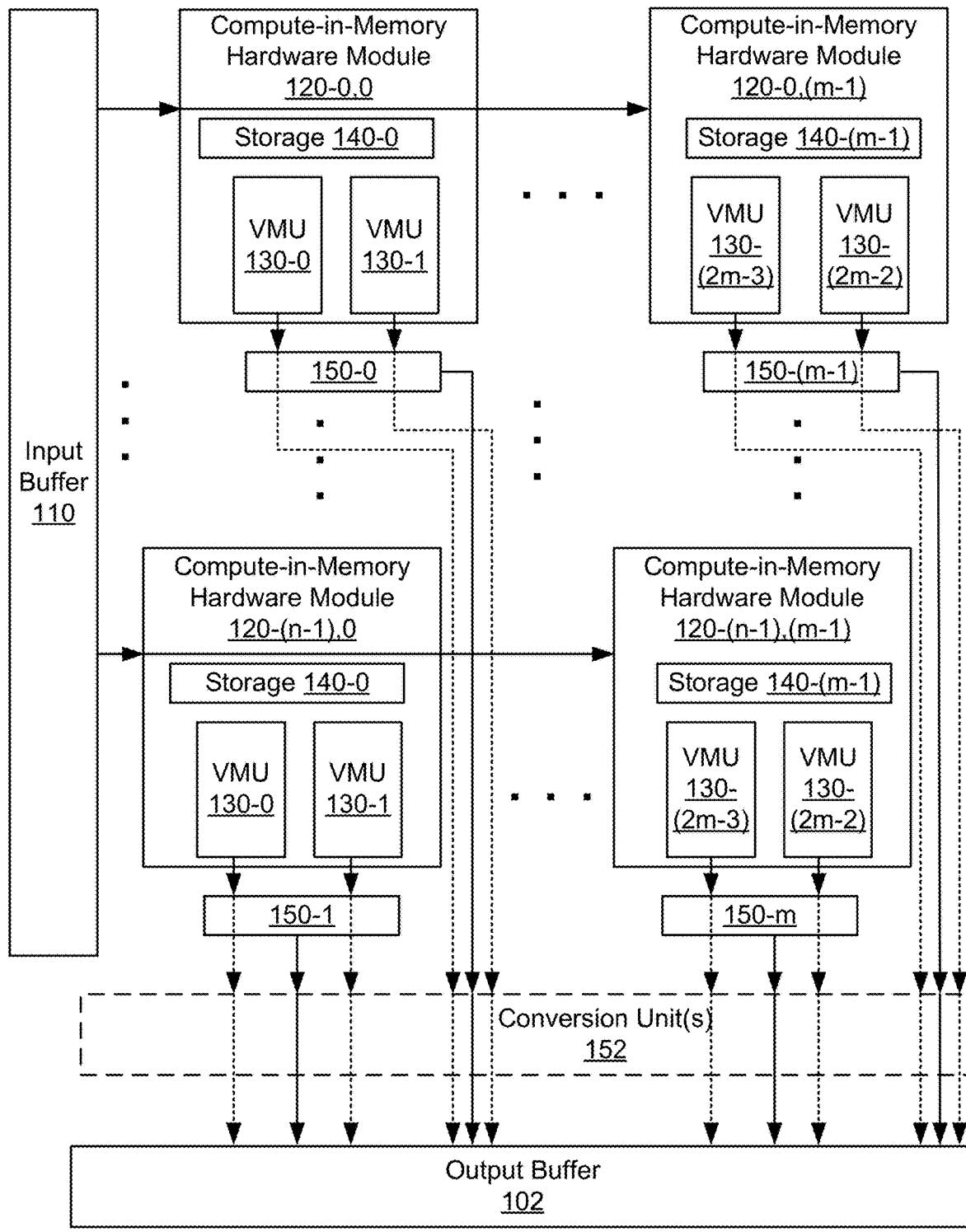
FIG. 1 is a block diagram depicting an embodiment of a compute engine usable in an accelerator for a learning network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A compute engine is described. The compute engine includes compute-in-memory (CIM) hardware modules and may include an input buffer coupled with the CIM hardware modules. The input buffer stores a vector. The CIM hardware modules are configured to store weights corresponding to a matrix and configured to perform a vector-matrix multiplication (VMM) for the matrix and the vector. The CIM hardware modules further include storage cells and vector multiplication units (VMUs) coupled with the storage cell and, if present, the input buffer. The storage cells store the weights. The VMUs are configured to multiply, with the vector, at least a portion of a weight of a portion of the plurality of weights. A set of VMUs of the plurality of VMUs is configured to perform multiplications for a first weight length (e.g. a first precision for the weights) and a second weight length (e.g. a second precision for the weights) different from the first weight length such that each VMU of the set of VMUs performs the multiplications for both the first weight length and the second weight length.

In some embodiments, the set of VMUs includes a first VMU and a second VMU, each of which is configured to perform the multiplications for the first weight length. In such embodiments, the second weight length is twice the first weight length. Thus, the resultants for the multiplications by the first and second VMUs are combined. In some embodiments, a combiner is coupled with the set. The combiner is configured to combine a product of the portion of each weight and an element of the vector for the second weight length. In some embodiments, the combiner is bypassed for the first weight length. In some such embodiments, the combiner shifts the product for a first VMU of the set by the first weight length relative to the product for a second VMU of the set.

In some embodiments, each element of the vector in the input buffer is serialized for the multiplications performed by the VMUs. In some embodiments, the vector has a vector sign and each of the weights has a weight sign. An indication of the vector sign is propagated to each VMU of the set of VMUs and the weight sign is propagated to a portion of the VMUs in the set of VMUs for the second weight length. In some such embodiments, the weight sign is extended for a remaining portion of the VMUs in the set of VMUs for the second weight length.

In some embodiments, the first weight length corresponds to more significant bits of a weight. The second weight length corresponds to a combination of the more significant bits of the weight and less significant bits of the weight. In such embodiments, the set of VMUs includes a first VMU for the more significant bits of the weight and at least a second VMU for the less significant bits of the weight. The set of VMUs may be configured to have a first precision for the first weight length and a second precision for the second weight length. In such embodiments, the second precision is a multiple of the first precision. In some embodiments, each VMU in the set of VMUs determines the multiplications using a lookup table.

An accelerator usable for a learning network (i.e. for artificial intelligence) is described. The accelerator includes a processor and compute engines coupled with the processor. Each compute engine includes CIM hardware modules and may include an input buffer coupled with the CIM hardware modules. The input buffer stores a vector. The CIM hardware modules are configured to store weights corresponding to a matrix and configured to perform a VMM for the matrix and the vector. The CIM hardware modules further include storage cells and VMUs coupled with the storage cell and, if present, the input buffer. The storage cells store the weights. The VMUs are configured to multiply, with the vector, at least a portion of a weight of a portion of the plurality of weights corresponding to a portion of the matrix. A set of VMUs of the plurality of VMUs is configured to perform multiplications for a first weight length and a second weight length different from the first weight length such that each VMU of the set of VMUs performs the multiplications for both the first weight length and the second weight length.

A method for performing a VMM is described. The method may be used in an accelerator for a learning network. The method includes providing a vector (e.g. an activation) to a compute engine. The compute engine includes CIM hardware modules and may include an input buffer coupled with the CIM hardware modules. The input buffer stores a vector. The CIM hardware modules are configured to store weights corresponding to a matrix and configured to perform a VMM for the matrix and the vector. The CIM hardware modules further include storage cells and VMUs coupled with the storage cell. The VMUs are also coupled to the input buffer, if any. The storage cells store the weights. The VMUs are configured to multiply, with the vector, at least a portion of each weight of a portion of the plurality of weights corresponding to a portion of the matrix. A set of VMUs of the plurality of VMUs is configured to perform multiplications for a first weight length and a second weight length different from the first weight length such that each VMU of the set of VMUs performs the multiplications for both the first weight length and the second weight length. The method also includes performing a VMM of the vector and the matrix using the CIM hardware module.

In some embodiments, the set of VMUs includes a first VMU and a second VMU. The first VMU and the second VMU are each being configured to perform the multiplications for the first weight length. The second weight length being twice the first weight length.

In some embodiments, the method also includes combining a product of the portion of each weight and an element of the vector for the second weight length. In some embodiments, combining the products further includes shifting the product for a first VMU of the set of VMUs by the first weight length relative to the product for a second VMU of the set of VMUs. In some embodiments, providing the vector to the compute engine includes serializing each element of the vector.

In some embodiment, the vector includes a vector sign and each of the weights includes a weight sign. In such embodiments, performing the VMM includes propagating an indication of the vector sign to each VMU of the set of VMUs and propagating the weight sign to a portion of the VMUs for the second weight length. In some such embodiments, performing the VMM includes extending the weight sign for a remaining portion of the VMUs in the set for the second weight length.

The first weight length may correspond to more significant bits of a weight. The second weight length corresponds to a combination of the more significant bits of the weight and less significant bits of the weight. The set includes a first VMU for the more significant bits of the weight and at least a second VMU for the less significant bits of the weight. In some embodiments, the set of VMUs has a first precision for the first weight length and a second precision for the second weight length. The second precision is a multiple of the first precision. In some embodiments, performing the VMM includes determining the multiplications using a lookup table.

FIG. 1 is a block diagram depicting an embodiment of compute engine 100 usable in an accelerator for a learning network. Compute engine 100 includes input buffer 110, compute-in-memory (CIM) hardware modules 120-0,0 through 120-(n−1), (m−1) (collectively or generically 120), vector multiplication units (VMUs) 130-0 through 130-(2m−2) (collectively or generically 130) for each row of CIM hardware modules 120, storage (e.g. SRAM cells) 140-0 through 140-(m−1) (collectively or generically 140) for each row of CIM hardware modules 120, combiners 150-0 through 150-(m−1) (collectively or generically 150) for each row of CIM hardware modules 120, and output buffer 102. Although certain components are shown, in some embodiments, other and/or additional components may be present. Some components, such as input buffer 110 and/or output buffer 102 may be omitted or located in the system outside of compute engine 100. Although each CIM hardware module 120 is shown as including storage 140, in some embodiments, storage 140 may be located elsewhere (e.g. outside of CIM hardware modules 120 but within compute engine 100). Each CIM hardware module 120 has a set of two VMUs 130. In another embodiment, another number of VMUs 130 may be present in each CIM hardware module 120 (i.e. the set of VMUs 130 for a CIM hardware module 120 may include another number of VMUs 130, such as three or four).

Compute engine 100 is configured to perform a vector-matrix multiplication (VMM). More specifically, the data provided by input buffer 110 is multiplied, using CIM hardware modules 120, by the matrix stored in storage 140. In some embodiments, the data provided by input buffer 110 is a vector. For example, the vector provided to (and by) input buffer 110 may be an activation and the matrix stored in compute engine 100 may be a matrix of weights. Consequently, compute engine 100 is described in the context of weights that may be part of a weight matrix and activations (or vectors) to be multiplied by the weight matrix. The data provided by input buffer 110 may provide other, non-vector inputs. For example, the input signal provided by input buffer 110 represent a scalar or a matrix. Thus, as used herein, a vector provided to VMUs 130 for a VMM may include other non-vector inputs that can be multiplied by the data (e.g. the matrix) stored by compute engine 100 using CIM hardware modules 120 and VMMs 130.

Compute engine 100 includes an n×m array of CIM hardware modules 120, each of which includes two VMUs 130. Compute engine 100 may be used to perform a vector-matrix multiplication of weights having different weight lengths. Stated differently, compute engine 100 may be used for weights having different precisions. To do so, CIM hardware modules 120 may be used to partition a longer weight across multiple blocks (e.g. multiple VMUs 130). In the embodiment shown, the weights may have a first length (or precision) corresponding to a single VMU 130, or a second weight length (precision) corresponding to two VMUs 130 (i.e. the set of VMUs in each CIM hardware module 120). In some embodiments, each VMU 130 may be the same. In such embodiments, the second weight length is twice the first weight length.

For example, a VMU 130 may be configured to perform multiplications for stored weights having a weight length of four bits (i.e. four-bit precision weights). In this example, each CIM hardware module 120 performs a VMM for two four-bit long (four-bit precision) weights or one eight-bit long (eight-bit precision) weight. Compute engine 100 may thus perform a VMM for an n×m matrix of eight-bit precision weights or an n×2m matrix of four-bit precision weights. In some embodiments, therefore, all VMUs 130 in each CIM 120 are used in performing a VMM regardless of the lengths of the weights.

In some embodiments, the VMUs 130 in each CIM hardware module 120 may differ. In such embodiments, there is a first weight length for the first VMU 130, a second weight length for the set of two VMUs 130, and a third weight length for the second VMU 130. In such embodiments, the second weight length is the sum of the first and the third weight lengths of the VMUs 130. For clarity, compute engine 100 is described in the context of each VMU 130 and each CIM hardware module 120 being the same.

Combiners 150 are used in conjunction with CIM hardware modules 120. Combiners 150 combine the products of the VMUs 130 for the corresponding CIM hardware module. Thus, combiners 150 may be vector adders. For the weights having the second (longer) weight length, the product computed by VMUs 130 is appropriately combined in combiner 150 and provided to output buffer 102. Combining the products includes multiplying the products from particular VMU(s) 130 by the appropriate amount to account for the values being multiplied. For example, the most significant bits for a VMU 130 may be shifted the appropriate amount (e.g. by four places for an eight-bit long multiplication) and added to the least significant bits of the other VMU 130. If more than two VMUs 130 are present in a CIM hardware module 120, then the products from less significant bits in middle VMU(s) 130 are also shifted the appropriately. If, however, the stored weights have the first, shorter weight length (lower precision weights), then the combiner 150 may be bypassed. In this case, the multiple outputs of CIM hardware modules 120 are provided to output buffer 102. This is indicated by the dotted arrows in FIG. 1.

The output of a CIM hardware module 120 has a precision that is the sum of the precision of the inputs plus the base to logarithm of the number of rows minus 1. Stated differently, $$p_Q = p_A + p_W + \log_2 R - 1$$

where: $p_Q$=precision of the output of the VMM
$p_A$=precision of the activation
$p_W$=precision of the weights
R=number of rows in the weight matrix of CIM hardware module 120

In the example above (four-bit and eight-bit precisions for the weights), the calculated output precision is fourteen bits for weights and activations having four-bit precision and the matrix having 128 rows. The calculated output precision is twenty-two for the weights and activations having eight-bit precisions and the matrix having 128 rows. In order to accommodate both precisions and to prevent clipping (which introduces errors), compute engine 100 uses output precisions that are multiples. More specifically, combiners 150 utilize precisions that are multiples. Thus, combiner 150 has an output precision of fourteen for four-bit precisions weights and activations and 128 rows, while combiner 150 has an output precision of twenty-eight for eight bit precision. Combiner 150 and/or compute engine 100 are configured such that $p_O$ is fourteen for four bit weight lengths, while $p_O$ is twenty-eight for eight bit weight lengths.

In operation, CIM hardware module(s) 120 performs a multiplication of an element of the activation with the weight(s) in storage 140. For the first, shorter weight length (e.g. four-bit weights), each VMU 130 in a CIM hardware module 120 multiplies one weight by an element of the activation provided by input buffer 110. Thus, each row of compute engine 100 may perform up to 2m multiplications of the element(s) of the activation by weights. These products are provided to output buffer 120, effectively bypassing combiners 150. In some embodiments, therefore, both VMUs 130-i and 130-(i+1), where i=0, 2, 4, . . . (2m−2), in one or more CIM hardware modules 120 (i.e. both VMUs 130 of particular CIM hardware module(s) 120) are used to perform the VMM. Thus, in some or all of CIM hardware module(s) 120, no VMMs are deactivated (e.g. turned off or bypassed) when performing a VMM of the first, shorter weight length. For the second, longer weight length (e.g. eight-bit weights), each VMU 130 in a CIM hardware module 120 multiplies a portion of a weight (e.g. half of the weight) by an element of the activation provided by input buffer 110. These products of a portion of the weight with the element of the activation are provided to combiners 150 to be appropriately combined into the product of the element of the activation with the weight. Thus, each row of compute engine 100 may perform up to m multiplications of the element of the activation by weights having the longer, second weight length. Thus, for the first weight length and the second weight length, each VMU 120 of a set of VMUs 120 in one or more CIM hardware modules 130 performs the multiplications for both the first weight length and the second weight length. Therefore, in some or all of CIM hardware module(s) 120, both VMUs 120 activated (e.g. turned on or operating) when performing a VMM of the first, shorter weight length and when performing a VMM of the second, longer weight length.

In some embodiments, one or more conversion units 152 may be present in compute engine 100. Conversion unit(s) 152 is indicated with a dashed line. In some embodiments, the conversion unit(s) 152 receive input from combiner 150 and provide output to output buffer 102. The conversion unit(s) 152 may convert the output of combiners 150 to another format, such as BF16 (bFloat 16) or FP16 (floating point 16). In such embodiments, the output precision may be sixteen bits for four-bit and eight-bit weights. For example, the output vector for eight-bit precision may be 256 bits×16 bits. The corresponding output vector for for-bit precision may be 2×256 bits×16 bits (i.e. two vectors are output). However, in other embodiments, the conversion units may be omitted.

Using compute engine 100, efficiency and performance of a learning network may be improved. CIM hardware modules 120 perform VMMs in parallel using VMUs 130. Performing VMMs in parallel may dramatically reduce the time to provide the weighted signal (the activation multiplied by the weight matrix). Thus, performing inference(s) using compute engine 100 may require less time and power. This may improve efficiency of training and use of the model. Compute engine 100 may also have improved flexibility. More specifically, different weight lengths (i.e. different precision weights) may be stored and used for the weight matrix stored by compute engine 100. Thus, models having different weight lengths may be used in with compute engine 100. Because VMUs 130 may be used to perform VMMs of a portion of a (longer) weight or an entire (shorter) weight without deactivating a fraction of the VMUs 130 in all CIM hardware modules 120, more parameters may be used with shorter weight lengths. Thus, storage 140 is not wasted for shorter weights. For example, if compute engine 100 supports 4.5 million eight-bit precision parameters (e.g. weights), then compute engine 100 may also support nine million four-bit precision weights. Moreover, the precision of combiner 150 may be configured such that the output of compute engine 100 has appropriate length precision and does not induce error introduced by clipping for either weight length. In some embodiments, CIM hardware module(s) 120 may also be repurposed to perform VMMs on multiple data sets. For example, input buffer 110 might provide multiple vectors to CIM hardware modules 120. In some such embodiments, portions of CIM hardware modules 120 may store the weights for the corresponding matrices. CIM hardware modules 120 may then perform VMMs in parallel on multiple data sets. In some embodiments, CIM hardware modules 120 may perform VMMs for vectors from different data sets serially (e.g. perform VMMs for a first vector, then perform VMMs for a second vector). Consequently, flexibility, efficiency, and performance of compute engine 100 and the learning network with which compute engine 100 is used may be improved.

Figure 2:
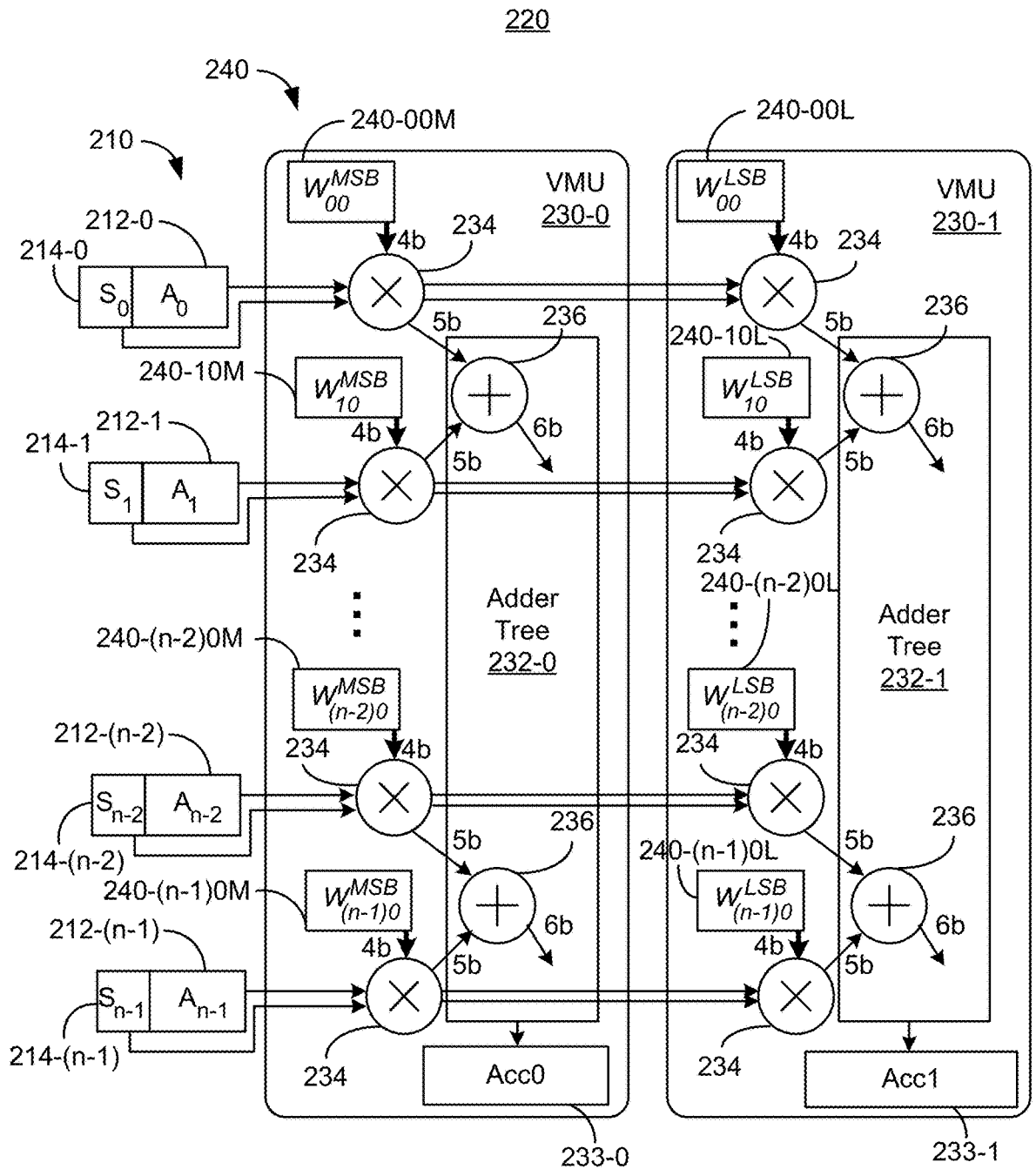
FIG. 2 is a block diagram of an embodiment of a compute-in-memory hardware module of a compute engine usable in an accelerator for a learning network.

FIG. 2 is a block diagram of an embodiment of CIM hardware module 220 of a compute engine usable in an accelerator for a learning network. CIM hardware module 220 is analogous to CIM hardware modules 120 and may be used in a compute engine analogous to compute engine 100. CIM hardware module 220 includes VMUs 230-0 and 230-2 (collectively or generically 230), input buffer 210, and storage 240. VMUs 230 are analogous to VMUs 130. Input buffer 210 is analogous to input buffer 110. Storage 240 is analogous to storage 140. However, storage 240 is shown as being within VMUs 230. Also explicitly shown are adder trees 232-0 and 232-1 (collectively or generically 232) and accumulators 233-0 and 233-1 (collectively or generically 233). Also indicated are modules 234 and 236 for multiply and addition operations, respectively. Although two VMUs 230 are shown for CIM hardware module 220, in some embodiments, another number of VMUs may be used. In such an embodiment, more than two precisions might be supported.

In the embodiment shown, CIM hardware module 220 may be used for two precisions. Consequently, CIM hardware module 220 is described in the context of four-bit lengths (first weight length/four-bit precision) and an eight-bit length (second weight length/eight-bit precision). For four-bit weights, each VMU 230 performs the multiplications for an entire weight. Thus, CIM hardware module 220 operates on two sets of weights for four-bit weights. For eight-bit weights, each VMU 230 performs multiplications for a portion (i.e. half) of a weight. Thus, CIM hardware module 220 operates on one set of weights for eight-bit weights. However, nothing prevents CIM hardware module 220 from utilizing different precision(s). Although not shown in FIG. 2, CIM hardware module 220 may be used in conjunction with a combiner having the appropriate precision(s) and that is analogous to combiner 150.

Input buffer 210 stores an activation (i.e., a vector) that may have n elements (e.g. $A_0$ through $A_{n-1}$). In addition, CIM hardware module 220 supports signed weights and activations. In the embodiment shown, an activation is represented by one bit of sign and remaining bits of magnitude. Thus, input buffer 210 is shown as having units 212-0 through 212-(n−1) (collectively or generically 212) that provide the magnitude of elements 0 through n−1 of the activation. Input buffer 210 also has sign units 214-0 (collectively or generically 214) that provide the sign of the activation. For example, a logical "0" may indicate a positive activation element, while a logical "1" may indicate a negative activation element. In other embodiments, another encoding scheme may be used to represent the elements of the activation. In some embodiments, input buffer 210 serializes the activations for use by VMUs 230.

Individual storage elements of storage 240 are also shown. For the higher precision (longer weight length), VMU 230-0 performs part of the VMM for the most significant bits (MSB) of a column, while VMU 230-1 performs part of the VMM for the least significant bits (LSB) of the column. Thus, storage 240 corresponding to VMU 230-0 includes storage elements 240-00M through 240-(n−1)0M (collectively or generically 240M) for the most significant bits of the column. For example, storage element 240-00M stores the most significant bits of the weight for the first row and column ($W_{00}^{MSB}$). Similarly, storage 240 corresponding to VMU 230-1 includes storage elements 240-00L through 240-(n−1)0L (collectively or generically 240L) for the least significant bits of the column. For example, storage element 240-00L stores the least significant bits of the weight for the first row and column ($W_{00}^{LSB}$).

For the lower precision weights, storage elements 240M provide storage for one column of weights, while storage elements 240L provide storage for the next column of weights. In the embodiment shown, the lower precision/weight length is four bits, while the higher precision/weight length is eight bits. Thus, VMUs 230 indicate the number of bits being forwarded to and/or from operations (e.g. 4b for four bits, 5b for five bits, and 6b for six bits). In the embodiment shown, the weights may also be signed or unsigned. For signed weights, a weight is represented by one bit of sign and remaining bits of magnitude. In other embodiments, another encoding scheme may be used.

For eight-bit precision (i.e. the longer weight length/higher precision) operations, sign units 214 provide the sign bit for the element of the activation (e.g. $A_0$) to multiplier modules 234 of both VMU 230-0 and VMU 230-1. Thus, the sign bit of the activation is propagated to multiplier modules 234 for both the most significant bits and the least significant bits. Units 212 provide the serialized magnitude of the element of the activation to multiplier modules 234 both VMU 230-0 and VMU 230-1. Sign units 214 may send the sign bit for each multiplication (i.e. along with each element of the magnitude). Multiplier modules 234 may perform a sequential multiplication of the stored portion of the weight with the activation and account for the sign of the weight and activation.

For VMU 230-0, the four bits (4b) representing the most significant bits of the weight are provided from storage element 240M to the multiplier module 234. These four bits include the sign and three bits of magnitude. For VMU 230-1, the four bits (4b) representing the weight are provided from storage element 240L to the multiplier module 234. These four bits include four bits of magnitude with no sign. Thus, the sign bit from storage corresponding storage element 240M is propagated to VMU 230-1. Multiplier module 234 of VMU 230-1 uses this propagated sign bit to extend the weight from storage element 240L to include the sign (e.g. adding the sign bit). Thus, the output of multiplier module 234 of VMU 230-1 is five bits. The output of storage element 230M has also been extended by multiplier module 234 to five bits to unify the operations. Extending the output of storage element 230M may include duplicating the sign bit for the weight stored in storage element 230M. In some embodiments, the extension may be performed in another manner.

VMUs 230 may operate serially and bit-wise. The multiplications for a first bit in the activation and a first bit in the weight are performed by multiplier modules 234 in parallel in each VMU 230. The resultant is provided to adder tree 232 and the multiplication for the next bit in the activation and the next bit in the weight are performed. Adder trees 232 use addition modules 236 to add the outputs of multiplier modules 234. Accumulators 233 may be shift and accumulate circuits to manage the serial nature of the operations performed by multiplier modules 234 and addition modules 236. The resultant may be output by accumulators 233.

For four-bit precision (i.e. the shorter weight length/lower precision) operations, sign units 214 provide the sign bits for the elements of the activation to multiplier modules 234 of both VMU 230-0 and VMU 230-1. The sign bit of the activation is propagated to multiplier modules 234 for both columns of the four-bit weights handled by VMU 230-0 and VMU 230-1. Units 212 provide the serialized magnitude of the element(s) of the activation to multiplier modules 234 both VMU 230-0 and VMU 230-1. Sign units 214 may send the sign bit for each multiplication (i.e. along with each element of the magnitude). In some embodiments, two elements for the activation may be provided by each set of units 212 and 214. Thus, a four-bit activation may be used with four-bit weights. Multiplier modules 234 may perform a sequential multiplication of the stored portion of the weight with the activation and account for the sign of the weights and activation.

For VMU 230-0, the four bits (4b) representing the entire four-bit weight are provided from storage element 240M to the multiplier module 234. These four bits include the sign and three bits of magnitude. For VMU 230-1, the four bits (4b) representing the weight are provided from storage element 240L to the multiplier module 234. These four bits also include one sign bit and three bits of magnitude. Thus, the sign bits from storage element 240M need not be propagated. In some embodiments, multipliers 234 of VMUs 230 do not extend the weights by adding additional sign bits. In such embodiments, the outputs of storage elements 240M and 240L are simply used. In other embodiments, the output from storage elements 240L and 230M are each extended (e.g. the sign bit is duplicated) for four-bit weights. In such embodiments, multipliers 234 may operate on the same number of bits from storage elements 240M and 240L as for eight-bit precision.

VMUs 230 may still operate serially and bit-wise for four-bit precision. Adder trees 232 use addition modules 236 to add the outputs of multiplier modules 234. Accumulators 233 may shift and accumulate circuits to manage the serial nature of the operations performed by VMUs 230. The output of accumulators 233 may be provided to a combiner (not shown). Such a combiner is configured to treat the four-bit and eight-bit weights differently.

In some embodiments, the sign of the activation and weights may be managed in VMUs 230 as follows. An element of the activation, $A_i$, may be given by:

$$A_i = S_{A_i} \sum_{p-2}^{p_A-2} 2^p a_i^p \text{ where}$$

-continued $S_{A_i}$ is the sign bit $$S_{A_i} = d_i^{p_A - 1}$$

In such embodiments, the output may be given by:

$$Q_j = \sum_i A_i W_{ij} = \sum_i \sum_p 2^p a_i^p S_{A_i} W_{ij} = \sum_p 2^p \sum_i a_i^p S_{A_i} W_{ij}$$

where: $W_{ij}$ is the weight for the $i^{th}$ row and $j^{th}$ column.

In addition, flags may be used to indicate whether a four-bit word (i.e. a weight, a portion of a weight, or element of an activation) contains a sign. Stated differently, flags may be used to determine when the sign extended. The flag, S, may be set to a logical "0" for a signed word, while S may be set to a logical "1" for an unsigned word. For eight-bit precision, the sign is propagated from the most significant bit of the next (or previous) word, as discussed herein. For example, $S_A$ may be the sign flag for the activation, while $S_W$ is the sign flag for the weight. For such words, $A_i$ is a bit in the element of the activation, while $W_j$ is a bit in the corresponding weight. In such embodiments, the truth table may be given by:

| $S_A$ | $S_W$ | $A_4$ | $A_3$ | $W_4$ | $W_3$ |
|---|---|---|---|---|---|
| 0 | 0 | $A_8$ | $A_3$ | $W_8$ | $W_3$ |
| 0 | 1 | $A_8$ | $A_3$ | $W_3$ | 0 |
| 1 | 0 | $A_3$ | 0 | $W_8$ | $W_3$ |
| 1 | 1 | $A_3$ | 0 | $W_3$ | 0 |

The truth table indicates, for example, where both the activation and weight are signed, the sign bits ($A_8$ and $W_8$) are extended to replace the most significant bit (A4 and W4) in the next word. In some embodiments, the sign of the activations and/or weights may be managed in another manner.

Compute engines using CIM hardware module 220 may share the benefits of compute engine 100. VMMs may be performed in parallel using VMUs 230. Thus, efficiency, training, and usage of a corresponding learning network may be improved. Further different precision weights may be stored and used. This improved flexibility may be provided without wasting storage when lower precision weights are used. Moreover, the precision of a combiner may be selected such that the output of a CIM hardware module 220 has the appropriate length precision and does not induce error introduced by clipping. CMM hardware modules 220 may also be used to perform VMMs on multiple data sets, either at substantially the same time or non-simultaneously (e.g. serially). Flexibility of compute engines using CIM hardware modules 220 may thus be further enhance. Consequently, flexibility, efficiency, and performance of CIM hardware module and the learning network with which CIM hardware module 220 is used may be improved.

Figure 3:
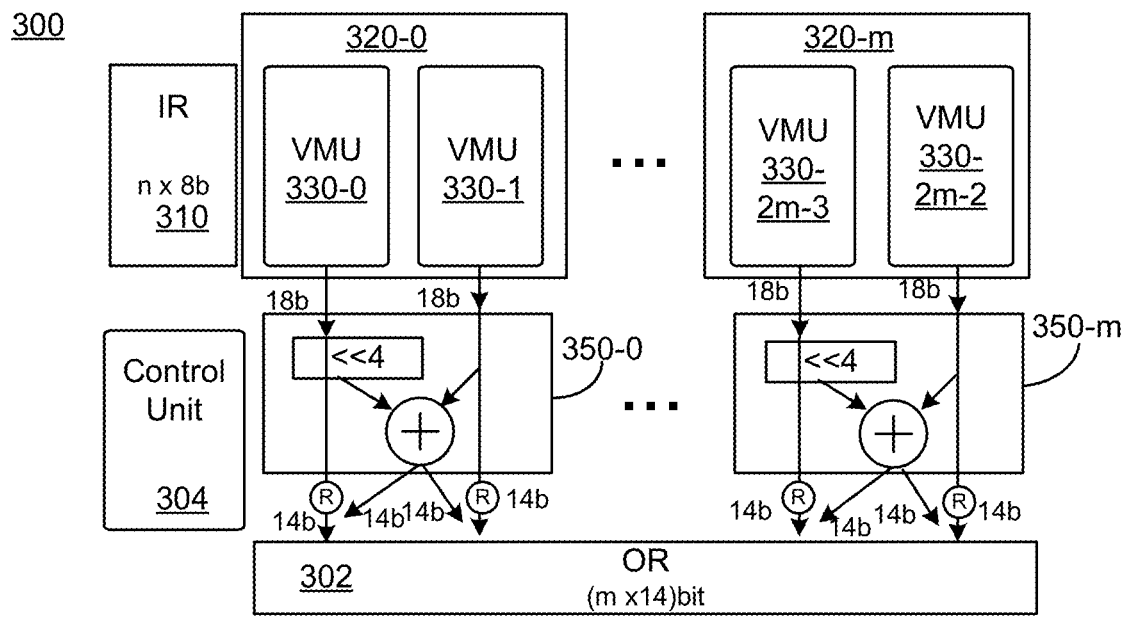
FIG. 3 depicts an embodiment of a portion of a compute engine usable in an accelerator for a learning network.

FIG. 3 depicts an embodiment of a portion of compute engine 300 usable in an accelerator for a learning network. Compute engine 300 is analogous to compute engine 100. Compute engine 300 includes CIM hardware modules 320-0 through 320-m (collectively or generically 320). FIG. 3 may thus be considered to depict a row of CIM hardware modules 320. Also shown are VMUs 330-0 through 330-(2m−2) (collectively or generically 330), input buffer (also termed input register) 310, combiners 350-0 through 350-m (collectively or generically 350), output buffer (also termed output register) 302, and control unit 304. VMUs 330 are analogous to VMUs 130 and/or 230. Input buffer 310 is analogous to input buffer(s) 110 and/or 210. Although not shown, compute engine 300 also includes storage analogous to storage 140 and/or 240. Although two VMUs 330 are shown for each CIM hardware module 320, in some embodiments, another number of VMUs may be used. In such an embodiment, more than two precisions might be supported. Compute engine 300 supports multiple precisions (e.g. weights having different lengths). For clarity, compute engine 300 is described in the context of four-bit and eight-bit precision (e.g. a first weight length of four bits for each VMU 330 operating on a weight and a second weight length of eight bits for each VMU 330 operating on half of a weight).

Input buffer 310, CIM hardware modules 320, and VMUs 330 may be configured and operate in an analogous manner to input buffer 110 and/or 210, CIM hardware modules 120 and/or 220, and VMUs 130 and/or 230. Thus, the output of each VMU 330 for CIM hardware modules 320 may be for half of a weight (eight-bit weights) or a full weight (four-bit weights). For four-bit precision, control unit 304 manages compute engine 300 such that operations of combiners 350 are bypassed. For example, combiners 350 may be deactivated for four-bit precision. In some embodiments, bit reduction circuits, R, may be used to remove the most significant bit after the sign. In other embodiments, bit reduction circuits may be omitted. Thus, m fourteen bit resultants are provided from combiners 350 to output register 302 for four-bit precision.

For eight-bit weights, combiners 350 are activated. The outputs of VMUs corresponding to the most significant bits (e.g. alternate VMUs from VMU 330-0 through VMU 330-(2m−3)) are multiplied by 24 (i.e. 16) and added with the outputs of VMUs corresponding to the least significant bits (e.g. alternate VMUs from VMU 330-1 through VMU 330-(2m−2)). The fourteen most significant bits and fourteen least significant bits of the resultant for each combiner 350 are provided to output buffer 302. Twenty-eight bit precision is used in this case although twenty-two bit precision is possible for eight-bit weights. This allows use of CIM hardware modules 320, combiners 350, and compute engine 100 for both eight-bit and four-bit precision while reducing or eliminating a loss of accuracy due to clipping.

Compute engine 300 shares the benefits of CIM hardware module 220 and compute engine 100. Thus, flexibility, efficiency, and performance of a learning network using compute engine 300 may be improved.

Figure 4:
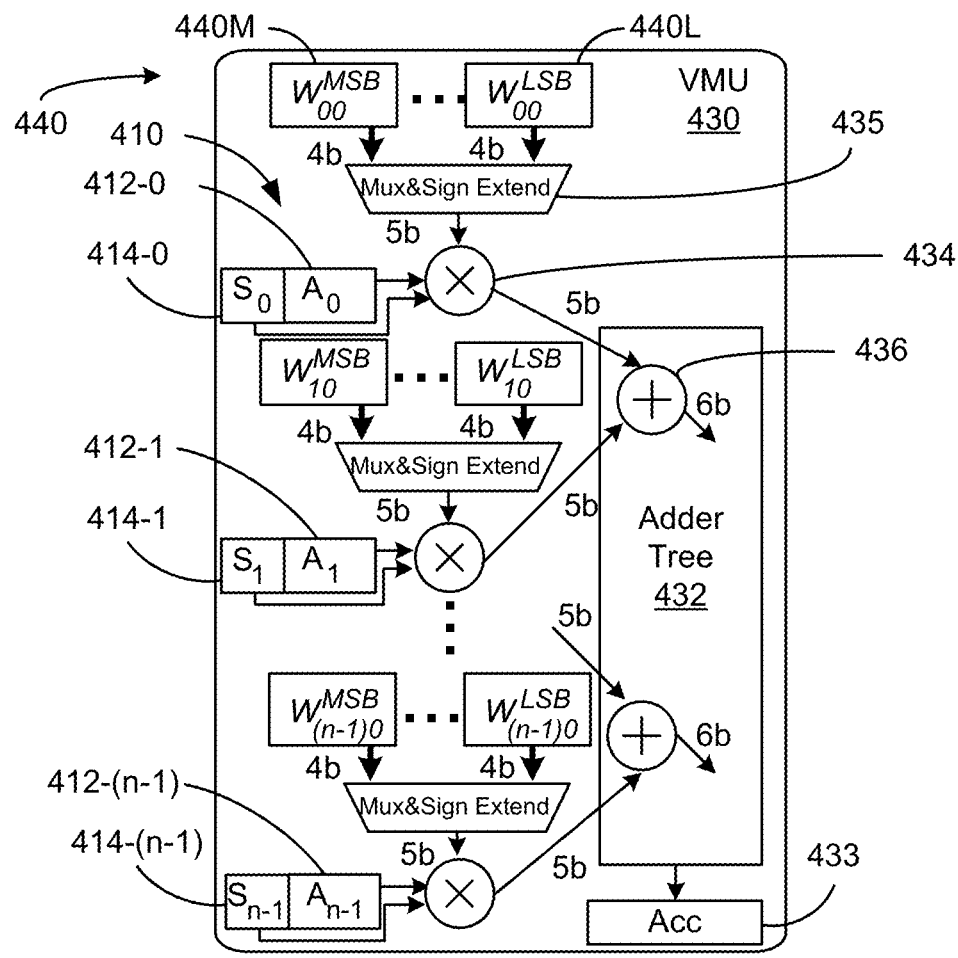
FIG. 4 depicts an embodiment of a portion of a compute engine usable in an accelerator for a learning network.

FIG. 4 depicts an embodiment of a portion of a compute engine usable in an accelerator for a learning network. FIG. 4 depicts VMU 430 that may be used in a CIM hardware module such as CIM hardware modules 120, 220, and/or 320. VMU 430 includes input buffer 410 (which may be considered separate from VMU 430), storage 440, adder tree 432, accumulator 433, multiplier modules 434 (of which only one is labeled), and addition modules 436 (of which only one is labeled). Input buffer 410 is analogous to input buffers 110, 210, and/or 310. Storage 440 is analogous to storage 140 and/or 240. Adder tree 432 and accumulator 433 are analogous to adder trees 232 and accumulators 233, respectively. Modules 434 and 436 are analogous to modules 234 and 236, respectively. VMU 430 also includes multiplexer and sign extender (MUXE) 435 (of which only one is labeled).

Storage 440 includes storage elements 440M (of which only one cell is labeled) and 440L (of which only one is labeled). Storage elements 440M store the most significant bits for a weight, while storage elements 440L store the least significant bits. In some embodiments, additional storage elements storing intermediate bits may be present. Input buffer 410 includes units 412-0 through 412-(n−1) (collectively or generically 412) that provide the magnitude of elements 0 through n−1 of the activation. Input buffer 410 also has sign units 414-0 (collectively or generically 414) that provide the sign of the activation. In other embodiments, another encoding scheme may be used.

VMU 430 operates in an analogous manner to VMUs 130, 230, and 330.

However, multiple columns of storage cells for storage 440 may share adder tree 432. For example, VMU 430 may include two columns of storage 440, corresponding to storage cells 440M and 440L. Thus, VMU 430 corresponds to VMUs 230-0 and 230-1. MUXE 435 selects the storage cell 440M or 440L having data to be input to multiplier module 434. MUXE 435 also serializes this data and extends the sign (e.g. for the portion of the weight stored in storage cell 440M). Through the use of MUXE 435 and adder tree 432, VMU 430 may perform column-by-column multiplication over time. The output of the column-column multiplication is stored in accumulator 433. Over time, the data moved to another memory to free space for accumulating another column-column multiplication. As a result, only a single adder tree 432 may be used for two columns of storage 440. VMU 430 may thus utilize fewer adder trees 432 than the combination of VMUs 230-0 and 230-1.

A compute engine using VMU 430 shares the benefits of CIM hardware module 220 and compute engine 100. Thus, flexibility, efficiency, and performance of a learning network using compute engine 300 may be improved. VMU 430 may also further improve efficiency. For VMU 430 operating on two columns, the latency of performing a full VMM is doubled. Because of the reduction in the number of adder trees, however, approximately a thirty percent to forty percent area reduction and/or a thirty percent power reduction may be achieved. As a result, performance of VMU 430, and the compute engine and/or CIM hardware module using VMU 430, may be improved. Moreover, in some embodiments, multiplier module 434 and/or 234 may be provided using a lookup table. For stationary weights, use of a lookup table may reduce power consumption. In some embodiments, the lookup table may be updated based on the sign of the activation with which the weight is being multiplied. For example, the sign of the weight may be flipped for a negative activation element. This sign flip (XOR) may be performed on the sign bit of the weight before the addition. In some embodiments, therefore, further power savings may be achieved using a lookup table for multiplier module(s) 434 and/or 234.

Figure 5:
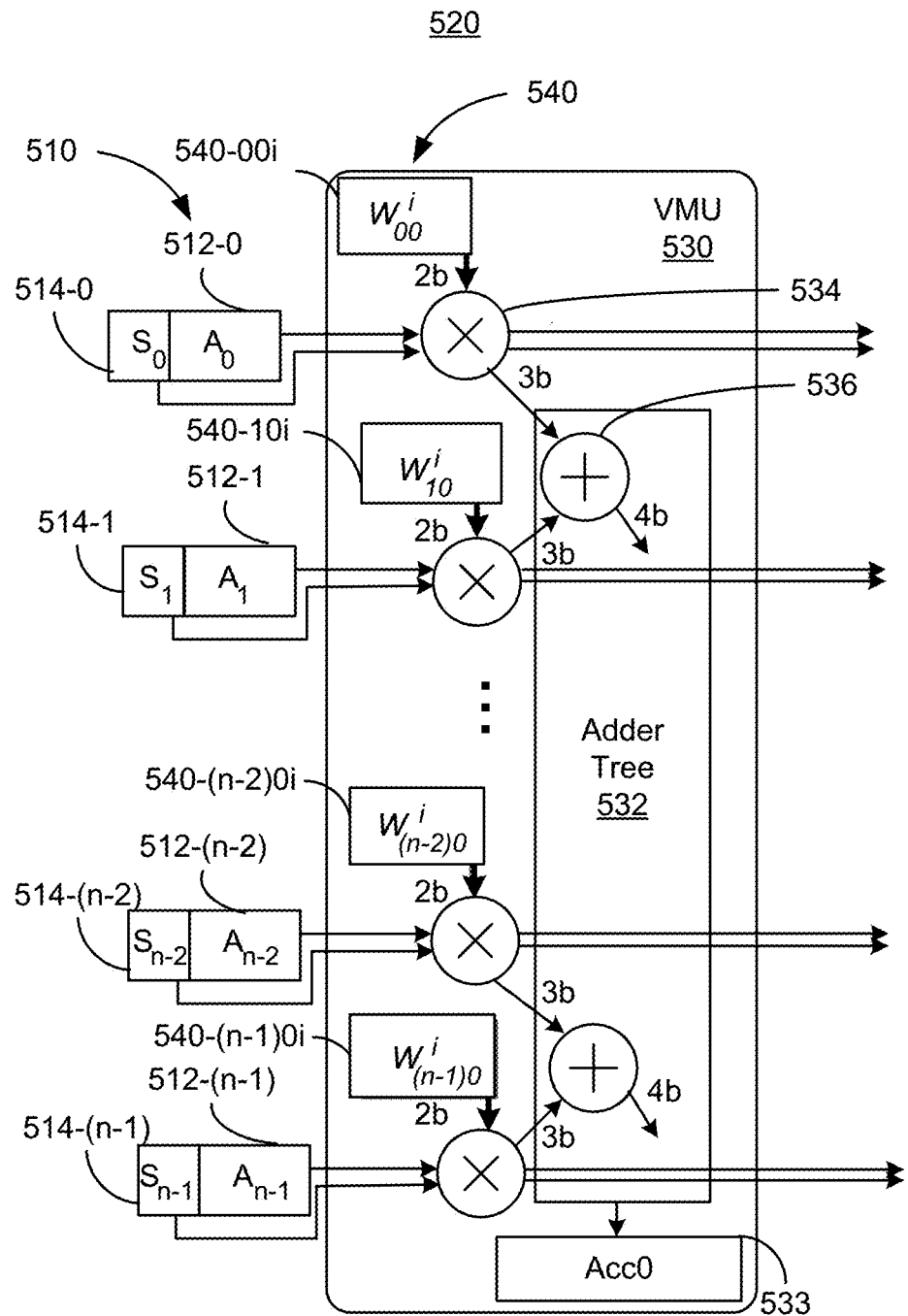
FIG. 5 depicts an embodiment of a portion of a compute engine usable in an accelerator for a learning network.

FIG. 5 depicts an embodiment of a portion of a CIM hardware module 520 usable a compute engine that may be in an accelerator for a learning network. FIG. 5 depicts input buffer 510, VMU 530, and storage 540 that may be used in a CIM hardware module such as CIM hardware modules 120, 220, and/or 320. VMU 530 includes storage 540, adder tree 532, accumulator 533, multiplier modules 534 (of which only one is labeled), and addition modules 536 (of which only one is labeled) that are analogous to storage 240, adder tree 232, accumulator 233, multiplier modules 234, and addition modules 236. Input buffer 510 is analogous to input buffers 110, 210, and/or 310.

Input buffer 510 includes units 512-0 through 512-(n−1) (collectively or generically 512) that provide the magnitude of elements 0 through n−1 of the activation. Input buffer 510 also has sign units 514-0 (collectively or generically 514) that provide the sign of the activation. In other embodiments, another encoding scheme may be used. Storage 540 includes storage elements 540-00$i$ through 540-(n−1)0$i$ (collectively or generically 540$i$) for a single column. Storage cells 540$i$ may store two-bit weights.

CIM hardware module 520 operates in an analogous manner to CIM hardware modules 120, 220, and/or 320. Thus, input buffer 510 serializes elements of the activation and provides the sign bit and magnitude to corresponding multiplication modules 534. The sign may be extended in an analogous manner to VMUs 230. Multiplier module 534 multiplies the activation element with the weight in corresponding storage element 540$i$. The resultant is provided to addition module 536 of adder tree 532. Thus, the sum is accumulated in accumulator 433.

CIM hardware module 520 CIM hardware module 520 indicates how the architecture described herein may be scaled. VMU 530 supports two-bit weights (first weight length/precision of two bits). The output precision for VMU 530 is eleven bits for one hundred and twenty-eight rows. Multiple VMUs 530 may be combined in a CIM hardware module to support 2-bit, 4-bit, and/or 8-bit weight lengths.

CIM hardware module 520 shares the benefits of compute engine 100. In addition, the architecture of CIM hardware modules 120, 220, 320, and/or 420 may be extended not only to increasing precision (e.g. four-bit to eight-bit), but also to lower precisions (e.g. two-bit). Thus, flexibility of the architecture may be further enhanced.

Figure 6:
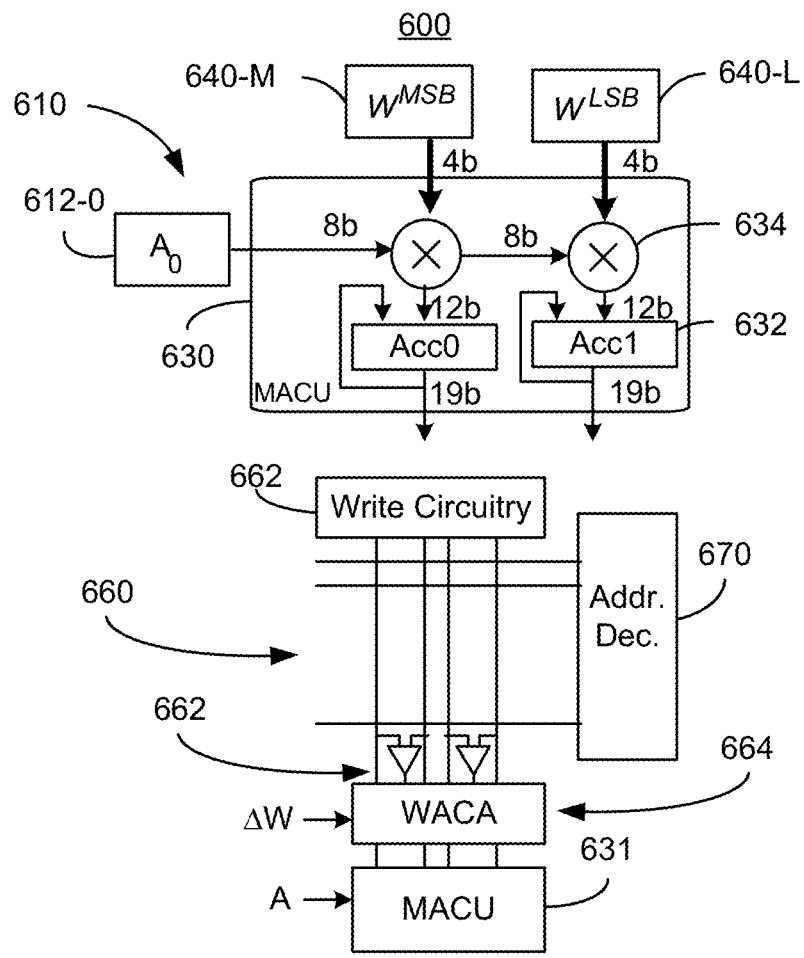
FIG. 6 depicts an embodiment of a portion of a compute engine usable in an accelerator for a learning network.

FIG. 6 depicts an embodiment of a portion of compute engine 600 usable in an accelerator for a learning network. Compute engine 600 is analogous to compute engine 100. However, compute engine may be at or near a memory, such as SRAM. Further, in place of VMUs, compute engine 600 utilizes multiply accumulate units (MACUs) 630 and 631. Compute engine 600 includes input buffer 610, storage, multiplier modules 634 (of which only one is labeled), accumulators 632 (of which only one is labeled) and local update circuitry 660. Storage includes storage elements 640-M and 640-L (collectively or generically 640) for the most significant and least significant bits. MACU 630 may be added at the readout circuitry of an SRAM (or other) bank memory of which storage elements 640 are a part. The entire input weight (e.g. eight bits) from storage elements 640 (which are shown as four bits each) is provided to MACU 630 upon reading of storage elements 640. The sign bit from storage element 640-M may be propagated in an analogous manner to VMUs 230, 430, and/or 530. As discussed for VMUs 130, 230, 430, and 530, the activation including a sign bit may be provided. MACU 630 may provide outputs to a combiner (not shown). Local update module 660 may also be provided. Local update module 660 may include write circuitry 660, vector adder 664, sense circuitry 662, address decoder 670, and MACU 631 analogous to MACU 630. Local update module 660 operates in an analogous manner to local update module 700, discussed in the context of FIG. 7.

Compute engine 600 may share some benefits of compute engine 100. Flexibility of compute engine 600 may be extended to multiple precisions while reducing or avoiding memory space. Moreover, compute engine 600 may perform VMMs at the corresponding storage bank. Moreover, local update module 660 may allow for updating of weights in memory elements 640. Thus, performance may be improved.

Figure 7:
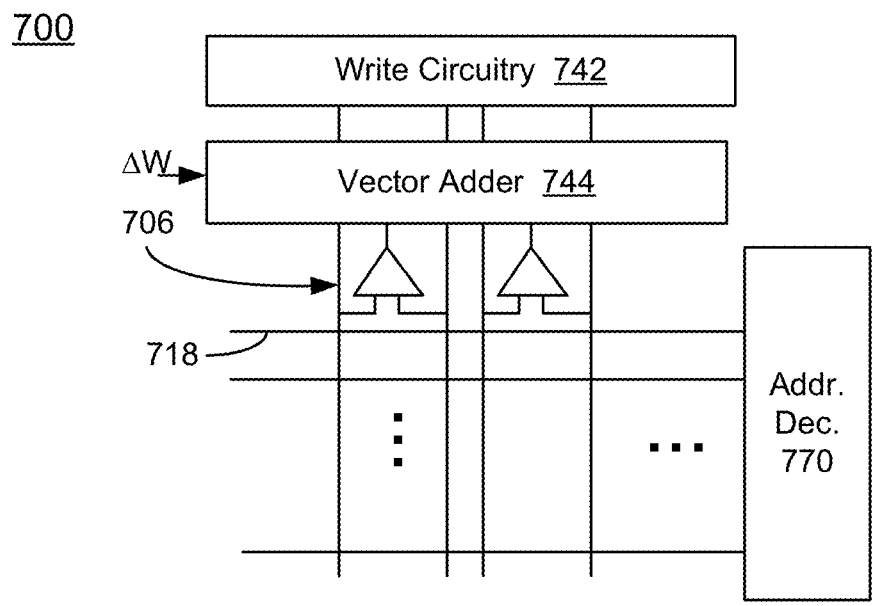
FIG. 7 depicts an embodiment of a portion of a local update module for a compute engine usable in an accelerator for a learning network.

FIG. 7 depicts an embodiment of a portion of local update (LU) module 700 for a compute engine usable in an accelerator for a learning network. LU module 700 is configured for a CIM hardware module analogous to the CIM modules described herein (e.g. in FIG. 1). LU module 700 includes sense circuitry 706 (of which only one is labeled), write circuitry 742, and adder circuitry 744. Write circuitry 742 and adder circuitry 744 are analogous to write circuitry 242 and vector adder 244, respectively. Sense circuitry 706 is coupled with each column of SRAM cells (not shown) of the CIM module (not explicitly shown). Also depicted is address decoder 770 that is analogous to address decoder 270.

Address decoder 770 selects the desired SRAM cell (not shown) of the CIM module via line 718 (of which only one is labeled). Sense circuitry 706 reads the value of the weight stored in the corresponding SRAM cell and provides the current weight to vector adder 744. The weight update ($\Delta W$) is input to vector adder 744. Vector adder 744 adds the weight update to the weight and provides the updated weight to weight circuitry 742. Write circuitry 742 writes the updated weights back to the corresponding SRAM cell. Thus, the portion of LU module 700 allows the weights in a CIM module to be updated locally. In some embodiments, a ternary update is used in updating the weights. In such embodiments, adder 742 may be replaced by a simple increment/decrement circuitry. In case of overflow, the updated weight may be saturated (e.g. to correspond to all ones of a binary number). Although LU module 700 is depicted in the context of SRAM cells, a similar architecture may be used for other embodiments such as resistive RAM cells.

Using LU module 700, particularly in the context of compute engine 100, a local weight update may be performed for storage cells of a CIM module. This may reduce the data movement that may otherwise be required for weight updates. Consequently, the time taken for training may be dramatically reduced. Efficiency and performance of a compute engine, as well as the learning network for which the compute engine is used, may be improved.

Figure 8:
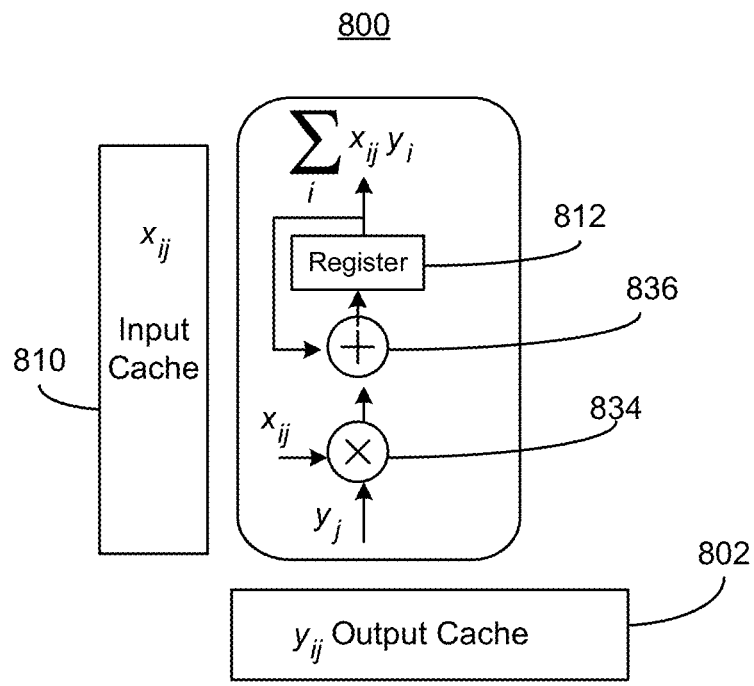
FIG. 8 depicts an embodiment of a portion of a batched weight update module a compute engine usable in an accelerator for a learning network.

FIG. 8 depicts an embodiment of a portion of batched weight update module 800 of a compute engine usable in an accelerator for a learning network. Batched weight update module 800 may be used to update weights stored in memory and/or compute engines such as compute engine 100 and/or 600. Batched weight update module includes input cache 810, output cache 802, register 812, addition module 836, and multiplier 834. A weight update uses the outer product of the back propagated loss function and the transpose of the weight matrix. Batched weight update module provides this using the inputs from a matrix ($x_{ij}$) and a vector ($y_j$). These quantities may be readily calculated, accumulated and stored. For multiple batches, a statistical value corresponding to the batched weight update (e.g. the average over a particular number of batches).

In particular, batched weight update module 800 may employ a scaled vector accumulator (SVA) in which the output cache 802 passes the data row by row ($y_j$) that is scaled (i.e. multiplied) by the corresponding $x_{ij}$ where j is the index of the row to be updated. The output gives provides the sum shown: $\Sigma_i x_{ij} y_i$. Where $x_{ij}$ corresponds to the matrix transpose and $y_i$ corresponds to the backpropagated loss. The output of accumulator 800 may be multiplied by a scalar representing the learning rate divided by the batch size for fixed precision update. Thus, the weight update may be determined. In some embodiments, a ternary update $\{-1, 0, $ or $1\}$ may be used. In such an embodiment, the output of batched weight update calculator 800 (i.e. register 812) may be directly ternarized to $\{-1, 0, 1\}$ signals. Then the output is passed to the addition module 836. In some embodiments, the caches 810 and 802 and update signals (e.g. from register 812) may be shared between tiles to conserve the resources. In some embodiments, batched weight update calculator 800 may be implemented using a SIMD instruction and/or a general purpose processor such as a RISC-V.

Using batched weight update calculator 800, weights may be more readily updated. Thus, efficiency of a learning network, including but not limited to learning networks employing compute engines such as compute engine 100 and/or CIM hardware modules 120, 220, 320, 520, and/or VMUs 130, 230, 330, 430, and/or 530 may be improved.

Figure 9:
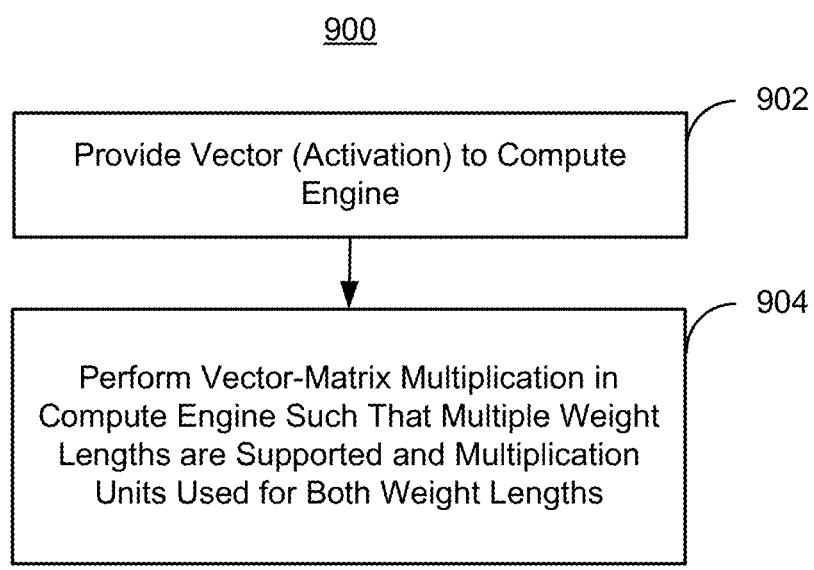
FIG. 9 is a flow chart depicting an embodiment of a method for using a compute engine usable in an accelerator for a learning network.

FIG. 9 is a flow chart depicting an embodiment of method 900 for using a compute engine usable in an accelerator for a learning network. Method 900 is described in the context of compute engine 100. However, method 100 is usable with other compute engines, such as compute engines using CIM hardware modules 220, 320, 520, and/or VMUs 130, 230, 330, 430, and/or 530. Although particular processes are shown in an order, the processes may be performed in another order, including in parallel. Further, processes may have substeps.

The activation is provided to the compute engine, at 902. In some embodiments, 902 includes serializing each element of the activation and providing the activations in parallel to the compute engine. In some embodiments, the sign of the activation is also provided.

At 904, the VMM is performed in parallel, for example using VMUs. Thus, the VMM may be performed bitwise and serially. Further, VMUs may be used for different precision weights. In some embodiments, all VMUs in a particular set of VMUs are used to perform the VMM regardless of the precision (i.e. weight length) of the weights and activation used.

For example, input buffer 110 may provide elements of an activation (or activations) to rows of CIM hardware modules 120, at 904. To do so, input buffer 110 may serialize the bits of each element and separately provide the sign bit, if any.

At 904, CIM hardware modules 120 perform VMMs of the elements of the activation with the weights stored in storage 140. This may be accomplished using VMUs 130. Because of the configurations of CIM hardware modules 120 and VMUs 130, both VMUs (e.g. VMU 130-0 and VMU 130-1) may be used in performing the VMM for both 4-bit weights and 8-bit weights. Further, one or more data sets may be operated on at 904, in parallel or in series. Based on the precision of the weights, combiners 150 appropriately combine the resultants from VMUs 130 to provide the desired product.

Using method 900, efficiency, performance, and flexibility of a learning network may be improved. CIM hardware modules 120 perform VMMs in parallel using VMUs 130 at 904. This may dramatically reduce the time to provide the weighted signal (the activation multiplied by the weight matrix). Thus, performing inference(s) using compute engine 100 may require less time and power. Training and use of the model may have improved efficiency. Different weight lengths (i.e. different precision weights) may be stored and used for the weight matrix multiplied by the activation at 904. Thus, models having different weight lengths may be used with compute engines, such as compute engine 100. Because VMUs 130 may be used at 904 to perform VMMs for higher precision (longer) weight or for more lower precision (shorter) weights. Thus, storage 140 is not wasted for shorter weights. Consequently, flexibility, efficiency, and performance of compute engine 100 and the learning network with which compute engine 100 is used may be improved.

Compute engines, CIM hardware modules, VMUs, and/or other mechanisms for updating or using matrices such as systems 100, 220, 300, 430, 520, 600, 700, and 800, may be part of a hardware accelerator. For example, FIGS. 10-16 depict compute tiles and compute engines (i.e. some or all of hardware accelerators) in which systems 100, 220, 300, 430, 520, 600, 700, and 800 may be utilized in providing learning networks 100, 300, and/or 700. These compute tiles and/or compute engines may be part of a system on a chip and/or network on a chip. Thus, method 900 and may also be used in connection with hardware accelerators depicted in FIGS. 10-16.

Figure 10:
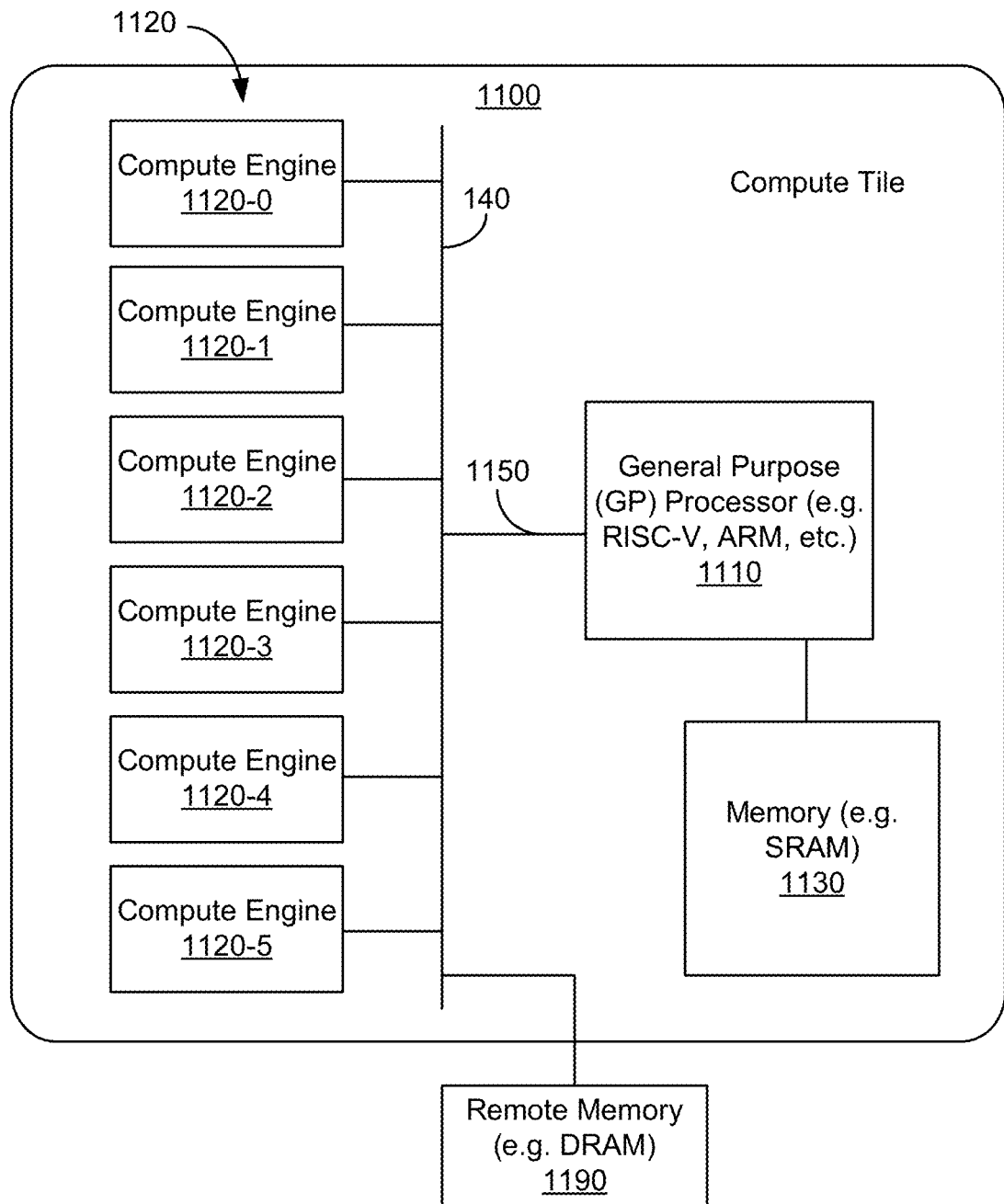
FIG. 10 is a diagram depicting an embodiment of a system usable in an accelerator for a learning network and having an efficient architecture.

FIG. 10 is a diagram depicting an embodiment of system 1100 usable in a learning network. System 1100 is a compute tile and may be considered to be an artificial intelligence (AI) accelerator having an efficient architecture. Compute tile (or simply "tile") 1100 may be implemented as a single integrated circuit. Compute tile 1100 includes a general purpose (GP) processor 1110 and compute engines 1120-0 through 1120-5 (collectively or generically compute engines 1120). Although five compute engines 1120 are shown, in other embodiments another number may be included. GP processor 1110 is shown as being coupled with compute engines 1120 via compute bus (or other connector) 1140, and bus 1150. In other embodiments, GP processor 1110 may be connected with compute engines 1120 in another manner. In some embodiments, compute tile 1100 may include on-tile memory 1130. In other embodiments, memory 1130 may be omitted. Other components, for example a cache or another additional memory, module(s) for applying activation functions, modules for moving data, and/or other modules, may be present in compute tile 1100 in some embodiments.

GP processor 1110 is a reduced instruction set computer (RISC) processor. For example, GP processor 1110 may be a RISC-V processor or ARM processor. In other embodiments, different and/or additional general purpose processor(s) may be used. The GP processor 1110 provides control instructions and data to the compute engines 1120. GP processor 1110 implements instruction set(s) used in controlling compute engines 1120. GP processor 1110 provides the commands to compute engines 1120 and controls data movement to and/or from compute engines 1120. GP processor 1110 may thus function as part of a control plane for (i.e. providing commands and being part of the data path) compute engines 1120 and tile 1100.

In some embodiments, data is moved from memory 1130 or another source to compute engine(s) 1120 through GP processor 1110. Data may be sent from memory 1130 to internal memory of GP processor 1110, and then to the appropriate compute engine(s) 1120 via buses 1140 and 1150. For example, data from memory 1130 may be provided to a vector register file (not shown) of GP processor 1110 and then provided from GP processor 1110 to the appropriate compute engine(s) 1120. Once compute engines 1120 have performed their functions, the output is provided to GP processor 1110. Similarly, data may be moved from compute engines 1120 to memory 1130 or another destination via GP processor 1110. Thus, GP processor 1110 may be part of both the control plane and data plane for compute tile 1100.

GP processor 1110 may also perform other functions. GP processor 1110 may apply activation function(s) to data. For example, an activation function (e.g. a ReLu, Tan h, and/or SoftMax) may be applied to the output of compute engine(s) 1120. Thus, GP processor 1110 may perform nonlinear operations. GP processor 1110 may also perform linear functions and/or other operations. However, GP processor 1110 is still desired to have reduced functionality as compared to, for example, a graphics processing unit (GPU) or central processing unit (CPU) of a computer system with which tile 1100 might be used.

Compute engines 1120 are configured to perform, efficiently and in parallel, tasks that may be part of using (e.g. performing inferences) and/or training (e.g. performing inferences and/or updating weights) a model. Compute engines 1120 are coupled with and receive commands and, in at least some embodiments, data from GP processor 1110. Compute engines 1120 are modules which perform vector-matrix multiplications (VMMs) in parallel. Thus, compute engines 1120 may perform linear operations. Each compute engine 1120 includes a compute-in-memory (CIM) hardware module (not specifically shown in FIG. 10). The CIM hardware module stores weights corresponding to a matrix and is configured to perform a VMM in parallel for the matrix. Compute engines 1120 may also include local update (LU) module(s) (not specifically shown in FIG. 10). Such LU module(s) allow compute engines 1120 to update weights stored in the CIM.

The CIM module is a hardware module that stores data and performs operations. In some embodiments, CIM module stores weights for the model. As such, the CIM module determines the maximum size of the model that can be handled by compute tile 1100 (i.e. the maximum number of parameters, or weights). The CIM module stores the weights (or other data) in cells that are fully addressable. The CIM module also performs operations using the weights. More specifically, the CIM module performs VMMs, where the vector may be an input vector (e.g. an activation) provided using GP processor 1110 and the matrix may be weights (i.e. data/parameters) stored by the CIM module. The CIM module may be considered to include a memory (e.g. that stores the weights) and compute hardware (e.g. that performs the vector-matrix multiplication of the stored weights). In some embodiments, the vector may be a matrix. The CIM module may include an analog SRAM having multiple SRAM cells and configured to provide output(s) (e.g. voltage(s)) corresponding to the data (weight/parameter) stored in each cell of the SRAM multiplied by a corresponding element of the input vector. In some embodiments, the CIM module may include a digital SRAM having multiple SRAM cells and configured to provide output(s) corresponding to the data (weight/parameter) stored in each cell of the digital SRAM multiplied by a corresponding element of the input vector. Other configurations of CIM modules are possible. Each CIM module thus stores weights corresponding to a matrix in its cells and is configured to perform a vector-matrix multiplication of the matrix with an input vector. In some embodiments, the CIM module of a compute engine 1120 may be repurposed as memory if the compute engine utilization falls below a particular threshold (e.g. 170%-80%). For example, the CIM might store duplicate weights or vectors (e.g. activations) in such embodiments.

In order to facilitate on-chip learning, local update (LU) modules (not shown) may also be provided in compute engines 1120. LU modules are coupled with the corresponding CIM modules. LU modules are used to update the weights (or other data) stored in the CIM modules. LU modules are considered local because LU modules are in proximity to CIM modules. For example, LU module(s) for a particular compute engine 1120 may reside in the same integrated circuit as the CIM module(s) for compute engine 1120. In some embodiments, the LU module is considered local because it is fabricated on the same substrate (e.g. the same silicon wafer) as the corresponding CIM module. In some embodiments, LU modules are also used in determining the weight updates. In other embodiments, a separate component may calculate the weight updates. For example, in addition to or in lieu of LU modules, the weight updates may be determined by GP processor 1110, in software by other processor(s) not part of compute tile 1100, by other hardware that is part of compute tile 1100, by other hardware outside of compute tile 1100, and/or some combination thereof.

Memory 1130 may be or include a static random access memory (SRAM) and/or some other type of memory. Memory 1130 is shown as coupled with GP processor 1110. Stated differently, data movement between memory 1130 and compute engines 1120 may take place via GP processor 1120. In some embodiments, memory 1130 may be coupled to compute bus 1140 (i.e. to compute engines 1120). Memory 1130 may store activations (e.g. input vectors provided to compute tile 1100 and the resultant of activation functions applied to the output of compute engines 1120). Memory 1130 may also store weights. For example, memory 1130 may contain a backup copy of the weights or different weights if the weights stored in compute engines 1120 are desired to be changed. In some embodiments, memory 1130 is organized into banks of cells (e.g. banks of SRAM cells). In such embodiments, specific banks of memory 1130 may service specific one(s) of compute engines 1120. In other embodiments, banks of memory 1130 may service any compute engine 1120.

In operation, an input vector is provided to one or more of compute engines 1120 by GP processor 1110. The input vector is desired to be multiplied by the weights, which may have been previously stored in compute engine(s) 1120. An input vector may be provided to multiple compute engines 1120 if the weight matrix and/or input vector have too many elements for a single compute engine. In some such embodiments, a portion of the input vector is provided to each of the multiple compute engines 1120 (each of which stores a portion of the weights). In some embodiments, the input vector is provided from memory 1130 to GP processor 1110 and from GP processor 1110 to compute engine(s) 1120. GP processor 1110 also instructs compute engine(s) 1120 to perform a VMM. Compute engine(s) 1120 perform a VMM between the input vector and the matrix of weights to provide an output. The VMM is performed in parallel for the elements of the input vector. The output of compute engine(s) 1120 may be considered an output vector. The output is provided by compute engine(s) 1120 to GP processor 1110. For example, the output may be stored in a vector register file of GP processor 1110. GP processor 1110 may also store the output (e.g. in memory 1130) and/or may provide the output to another component off-tile. GP processor 1110 may apply a function (e.g. an activation function) to the output. The results of the activation function applied to the output of compute engines 1120 may be stored in GP processor 1110 (e.g. in a buffer or the vector register file). GP processor 1110 may also store the results in memory 1130 or off-tile. GP processor 1110 may provide the results as an input vector to other compute engine(s) 1120 to apply a different set of weights to the results where another set of weights are stored in other compute engine(s) 1120. Thus, one or more inferences with one or more distinct sets of weights may be performed. In some embodiments, training may also be performed by tile 1100. In some such embodiments, GP processor 1110 or another component (such as a host) may determine the desired update for the weights. In some embodiments, LU module (not shown) of compute engines 1120 may be used to determine and apply the updates to the weights.

Also shown in FIG. 10 is remote memory 1190. For example, remote memory 1190 may include or be DRAM memory. Remote memory 1190 may be used for long term storage. For example, input activations for training, target outputs for training, and/or other information may be stored in DRAM 1190. This information may be loaded into compute tile 1100 as desired. For example, if compute tile 1190 includes insufficient memory for performing a training iteration as part of method 200, activations and/or other data may be temporarily stored and loaded from DRAM 1190 during the training iteration of method 200.

Thus, compute tile 1100 includes two compute blocks, GP processor 1110 and compute engines 1120, which work together. GP processor 1110 may perform nonlinear operations (e.g. activation functions) and compute engines perform 1120 may perform linear operations (e.g. VMMs). GP processor 1110 is in the control and data planes for compute engines 1120. GP processor 1110 and compute engines 1120 are, therefore, tightly coupled. Consequently, data may be moved more efficiently within tile 1100. Operations, such as VMMs and the application of activation functions to the output of compute engines 1120, may be more efficiently performed. Further, a special purpose controller need not be designed and fabricated for compute tile 1100. Instead, GP processor 1110 is used. As a result, compute tile 1100 may be more flexible and more readily designed and fabricated. For example, the activation applied by GP processor 1110 may be updated by updating GP processor 1110. A new special purpose controller need not be provided. Consequently, functions for machine learning may be more efficiently and readily performed. In addition, compute tile 1100 includes on-tile memory 1130. Use of on-tile memory, for example as a scratchpad memory, allows for a high degree of independence of compute tile 1100 from other components (e.g. other tiles). Thus, multiple tiles 1100 may more readily work in parallel. Consequently, efficiency of learning may be enhanced.

Figure 11:
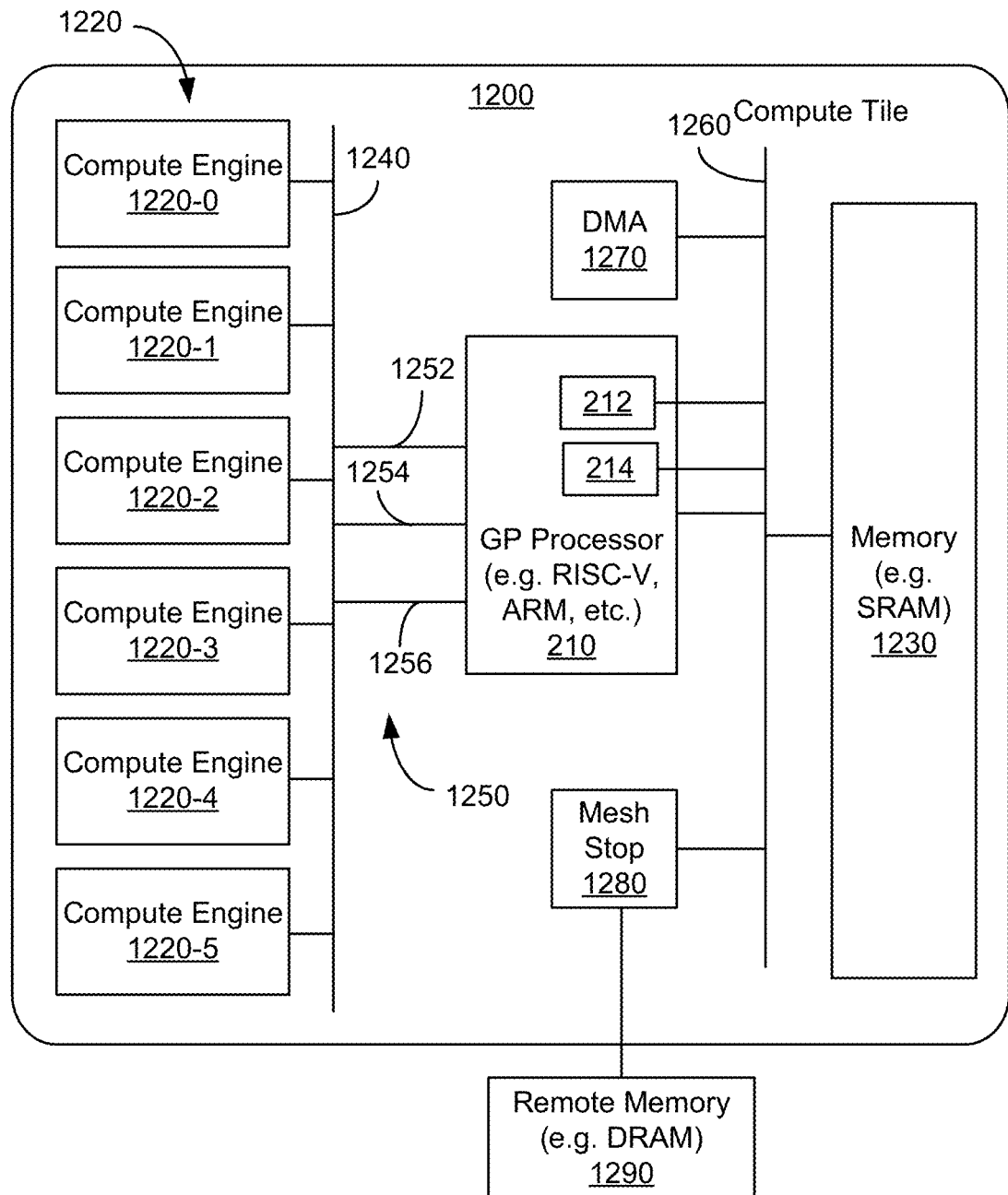
FIG. 11 depicts an embodiment of a system usable in an accelerator for a learning network and having an efficient architecture.

FIG. 11 is a diagram depicting an embodiment of compute tile 1200 usable in a learning network. Compute tile 1200 that may be an AI accelerator having an efficient architecture. Compute tile 1200 is analogous to compute tile 1100. Compute tile 1200 thus includes GP processor 1210 and compute engines 1220-0 through 1220-5 (collectively or generically compute engines 1220) analogous to GP processor 1110 and compute engines 1110-0 through 1110-5, respectively. Although five compute engines 1210 are shown, in other embodiments another number may be included. GP processor 1210 is shown as being coupled with compute engines 1220 via compute bus (or other connector) 1240, and bus 1250. In other embodiments, GP processor 1210 may be connected with compute engines 1220 in another manner. Compute tile 1200 may include on-tile memory 1230 that is analogous to on-tile memory 1130. Memory 1230 may thus be or include SRAM. Data movement between memory 1230 and compute engines 1220 may take place via GP processor 1220. In some embodiments, memory 1230 may be coupled to compute bus 1240 (i.e. to compute engines 1220). In the embodiment shown, compute tile 1200 also includes bus 1260, direct memory access (DMA) module 1270, and mesh stop 1280.

GP processor 1210 is analogous to GP processor 1110. Thus, GP processor 1210 may be a RISC-V processor or ARM processor. In other embodiments, different and/or additional general purpose processor(s) may be used. The GP processor 1210 provides control instructions and manages data flow for the compute engines 1220. Data sent to or from compute engines 1220 may also pass through GP processor 1210. Thus, GP processor 1210 may be part of both the control plane and data plane for compute tile 1200. GP processor 1210 may also perform other functions, including nonlinear functions. For example, GP processor 1210 may apply activation function(s) to data. In some embodiments, GP processor 1210 may include a vector processing unit (not shown) that executes nonlinear operations (e.g. applying activation functions to data). Also explicitly shown as part of GP processor 1210 are local memories 1212 and 1214. In some embodiments, local memory 1212 stores instructions while local memory 1214 stores data.

Compute engines 1220 are analogous to compute engines 1120. Compute engines 1220 are configured to perform, efficiently and in parallel, tasks that may be part of using and/or training a model. Compute engines 1220 are coupled with and receive commands and, in at least some embodiments, data from GP processor 1210. Compute engines 1220 perform linear operations such as VMMs in parallel. Each compute engine 1220 includes a CIM hardware module (not specifically shown in FIG. 11) analogous to that described for compute engines 1120. The CIM hardware module stores weights corresponding to a matrix and is configured to perform a VMM for the matrix. Compute engines 1220 may also include LU module(s) (not specifically shown in FIG. 11).

Bus 1250 couples GP processor 1210 with compute bus 1240 and, therefore, with compute engines 1220. Compute bus 1250 includes control bus 1252, streaming bus 1254, and status bus 1256. Control bus 1252, streaming bus 1254, and status bus 1256 are coupled with a control port (not explicitly labeled), a streaming port (not explicitly labeled), and a status port (not explicitly labeled), respectively, of GP processor 1210. Control bus 1252 receives instructions for compute engines 1220 from GP processor 1210. Compute engines 1220 perform operations based on the instructions. For example, the instructions may include a load instruction to load data from GP processor 1210 to identified compute engine(s) 1220, a store instruction to store data from identified compute engine(s) 1220 to GP processor 1210, and supporting instructions that identify the addresses in identified compute engine(s) 1220 to which data is to be loaded and from which data is to be read. Streaming bus 1254 may be a high speed, high bandwidth bus. In some embodiments, streaming bus 1254 is 512 bits wide. Other bus widths are possible. Streaming bus 1254 is used to rapidly move data between GP processor 1210 and compute engines 1220. Status bus may allow for reading from or writing to a status register for a compute engine 1220. Thus, GP processor 1210 may be informed of the particular compute engine 1220 completing a task, such as a VMM.

Compute tile 1200 also includes DMA 1270 and mesh stop 1280. DMA 1270 initiates data movement for compute tile 1200. DMA 1270 may be used to move data from off-tile to on-tile and vice-versa. Thus, DMA 1270 may be used to communicate with a host (not shown) and/or other tiles (not shown in FIG. 11). For example, DMA 1270 may be used to move input vectors (activations) from the host or another tile (not shown in FIG. 11) to memory 1230. If memory 1230 is also directly connected to compute engines 1220 (e.g. via compute bus 1240), then DMA 1270 may be used to move data between memory 1230 and compute engines 1220. Mesh stop 1280 provides an interface between compute tile 1200 and the fabric of a mesh network that includes compute tile 1200. Thus, mesh stop 1280 may be used to communicate with other compute tiles (not shown) with which compute tile 1200 may be used. Mesh stop 1280 may also be used to communicate with remote DRAM 1290. Data may also be moved via bus 1260. In some embodiments, therefore, data may be moved to and/or from memory 1230 as well as to and/or from tile 1200 via buses such as bus 1240, 1250, and/or 1260.

Compute tile 1200 functions in an analogous manner to compute tile 1100. For example, data may be transferred on-tile from a host or other tile via DMA 1270 and/or mesh stop 1280. Such data may be stored in memory 1230. Thus, memory 1230 may store weights and input vectors. The weights may be loaded in one or more compute engines 1220 for use. For example, the weights may be moved from memory 1230 to the CIM hardware module(s) of compute engine(s) 1220 via GP processor 1210. For an inference, an input vector is provided to one or more of compute engines 1220 by GP processor 1210. To do so, the input vector/activation may be moved from memory 1230 to GP processor 1210 and from GP processor 1210 to compute engine(s) 1220 via streaming bus 1254. Compute engine(s) 1220 perform a VMM in parallel of the elements of the input vector and the matrix (or matrices) of weights stored in compute engine(s) 1220. The output of compute engine(s) 1220 may be stored from compute engine(s) 1220 to GP processor 1210 via streaming bus 1254. GP processor 1210 may apply a function (e.g. an activation function) to the output. The resultant of the activation function applied to the output of compute engines 1220 may be stored in GP processor 1210 (e.g. a buffer, which is not explicitly shown in FIG. 11). GP processor 1210 may also store the resultant in memory 1230. GP processor 1210 may provide the resultant to another tile or the host via mesh stop 1280 or DMA 1270. GP processor may provide the resultant as an input vector to other compute engine(s) 1220 to apply a different set of weights to the resultant where another set of weights are stored in other compute engine(s). Thus, one or more inferences with one or more distinct sets of weights may be performed. In some embodiments, training may also be performed by tile 1200. In some such embodiments, GP processor 1210 or another component (such as a host) may determine the desired update for the weights. In some embodiments, LU module (not shown) of compute engines 1220 may be used to determine and apply the updates to the weights.

Compute tile 1200 may share the benefits of compute tile 1100. GP processor 1210 and compute engines 1220 are compute blocks which work closely together. For example, the data and control planes for compute tile 1200 may include memory 1230, GP processor 1210, buses 1240 and 1250, and compute engines 1220. Consequently, data may be moved more efficiently within tile 1200 and operations, such as VMMs and the application of activation functions, may be more efficiently performed. Further, a special purpose controller need not be designed and fabricated for compute tile 1200. As a result, compute tile 1200 may be more flexible and more readily designed and fabricated. Consequently, functions for machine learning may be more efficiently and readily performed. In addition, on-tile memory 1230 allows for a high degree of independence of compute tile 1200 from other components (e.g. other tiles).

Thus, multiple tiles 1200 may more readily work in parallel and efficiency may be improved.

Figure 12:
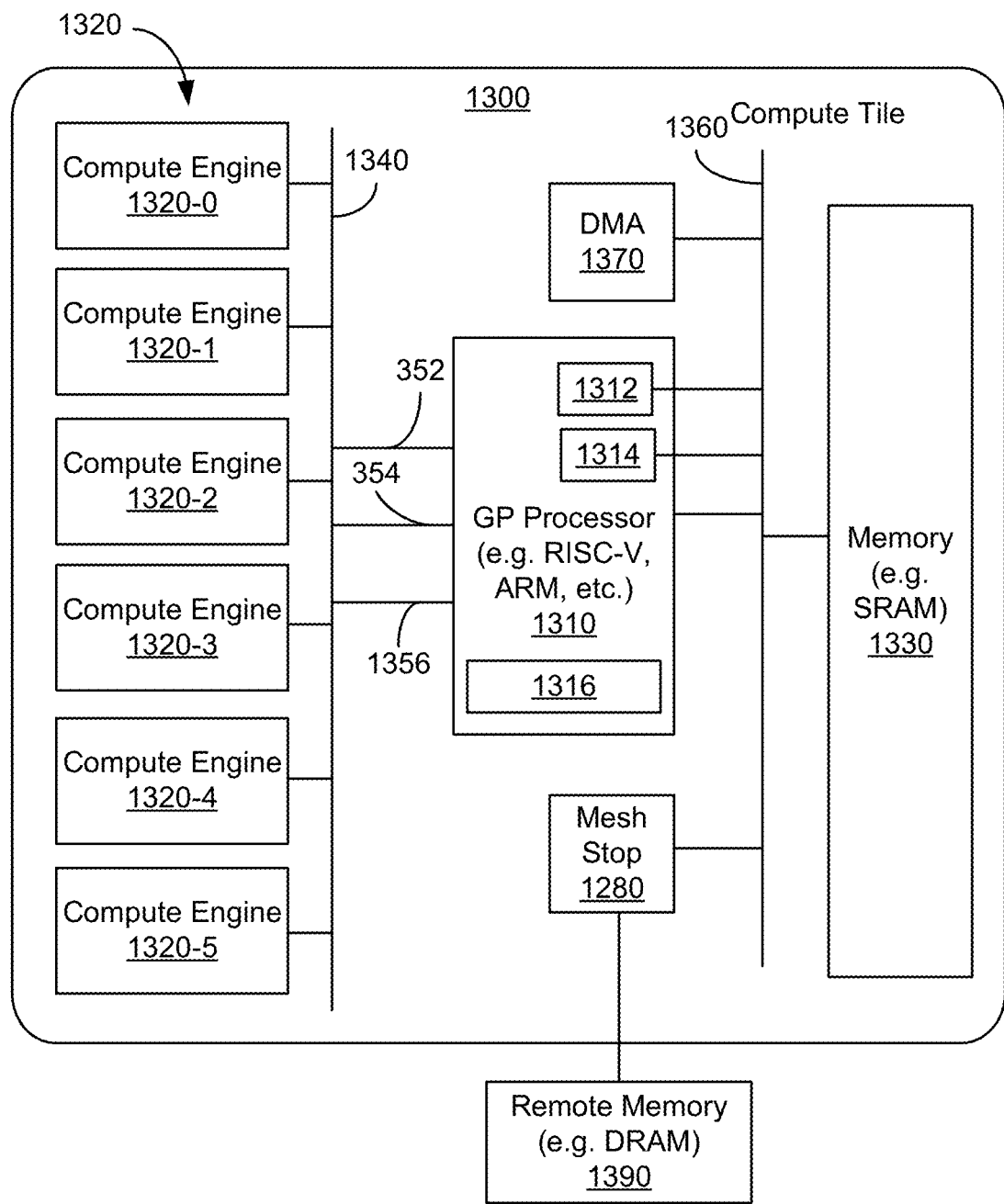
FIG. 12 depicts an embodiment of a system usable in an accelerator for a learning network and having an efficient architecture.

FIG. 12 is a diagram depicting an embodiment of compute tile 1300 usable in a learning network. Compute tile 1300 that may be an AI accelerator having an efficient architecture. Compute tile 1300 is analogous to compute tiles 1100 and 1200. Compute tile 1300 thus includes GP processor 1310, compute engines 1320-0 through 1320-5 (collectively or generically compute engines 1320), memory 1330, compute bus 1340, bus 1350, bus 1360, DMA 1370, and mesh stop 1380 that are analogous to GP processors 1110/210, compute engines 1120/220, memory 1130/230, compute bus 1140/240, bus 1150/250, bus 1260, DMA 1270, and mesh stop 1280, respectively. Although five compute engines 1310 are shown, in other embodiments another number may be included. GP processor 1310 is shown as being coupled with compute engines 1320 via compute bus (or other connector) 1340, and bus 1350. In other embodiments, GP processor 1310 may be connected with compute engines 1320 in another manner. GP processor 1310 also includes memories 1312 and 1314 analogous to local memories 1212 and 1214, respectively. Data movement between memory 1330 and compute engines 1320 may take place via GP processor 1320. For example, bus 1350 includes control bus 1352, streaming bus 1354, and status bus 1356 analogous to control bus 1252, streaming bus 1254, and status bus 1256, respectively. In some embodiments, memory 1330 may be coupled to compute bus 1340 (i.e. to compute engines 1320). Also shown is remote memory 1390 analogous to remote memories 1190 and/or 1290.

GP processor 1310 is analogous to GP processors 1110 and/or 1210. Thus, GP processor 1310 may be a RISC-V processor or ARM processor. In other embodiments, different and/or additional general purpose processor(s) may be used. The GP processor 1310 provides control instructions and manages dataflow for the compute engines 1320. Data sent to or from compute engines 1320 may also pass through GP processor 1310. Thus, GP processor 1310 may be part of both the control plane and data plane for compute tile 1300. GP processor 1310 may also perform other functions, including nonlinear functions. For example, GP processor 1310 may apply activation function(s) to data. In some embodiments, GP processor 1310 may include a vector processing unit (not shown) that executes nonlinear operations (e.g. applying activation functions to data).

In addition, GP processor includes an additional fixed function compute block (FFCB) 1316. In some embodiments, FFCB 1316 is a single instruction multiple data arithmetic logic unit (SIMD ALU). In some embodiments, FFCB 1316 may be configured in another manner. FFCB 1316 may be a close-coupled fixed-function unit for on-device inference and training of learning networks. In some embodiments, FFCB 1316 executes nonlinear operations, number format conversion and/or dynamic scaling. In some embodiments, other and/or additional operations may be performed by FFCB 1316. FFCB 1316 may be coupled with the data path for the vector processing unit of GP processor 1310.

Compute engines 1320 are analogous to compute engines 1120 and/or 1220. Compute engines 1320 are configured to perform, efficiently and in parallel, tasks that may be part of using and/or training a model. Compute engines 1320 are coupled with and receive commands and, in at least some embodiments, data from GP processor 1310. Compute engines 1320 perform linear operations such as VMMs in parallel. Each compute engine 1320 includes a CIM hardware module (not specifically shown in FIG. 12) analogous to that described for compute engines 1120. The CIM hardware module stores weights corresponding to a matrix and is configured to perform a VMM for the matrix. Compute engines 1320 may also include LU module(s) (not specifically shown in FIG. 12). In addition, on-tile memory 1330 allows for a high degree of independence of compute tile 1300 from other components (e.g. other tiles). Thus, multiple tiles 1300 may more readily work in parallel.

Figure 13:
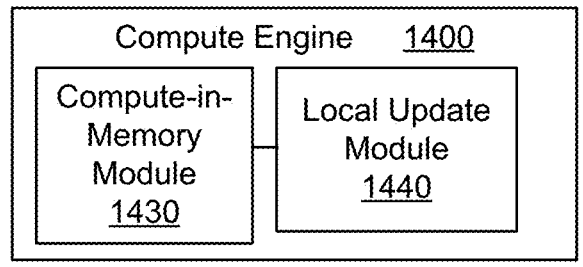
FIG. 13 depicts an embodiment of a portion of a compute engine usable in an accelerator for a learning network.

FIG. 13 depicts compute engine 1400 usable in an AI accelerator. Compute engine 1400 may be part of an AI accelerator that can be deployed for using a model (not explicitly depicted) and for allowing for on-chip training of the model (otherwise known as on-chip learning). Compute engine 1400 may thus be used as compute engine(s) 1120, 1220, and/or 1320. Compute engine 1400 includes CIM module 1430 and LU module 1440. Although one CIM module 1430 and one LU module 1440 is shown, a compute engine may include another number of CIM modules 1430 and/or another number of LU modules 1440. For example, a compute engine might include three CIM modules 1430 and one LU module 1440, one CIM module 1430 and two LU modules 1440, or two CIM modules 1430 and two LU modules 1440.

CIM module 1430 is a hardware module that stores data and performs operations. In some embodiments, CIM module 1430 stores weights for the model. CIM module 1430 also performs operations using the weights. More specifically, CIM module 1430 performs vector-matrix multiplications, where the vector may be an input vector provided using processor 1110 and the matrix may be weights (i.e. data/parameters) stored by CIM module 1430. Thus, CIM module 1430 may be considered to include a memory (e.g. that stores the weights) and compute hardware (e.g. that performs the vector-matrix multiplication of the stored weights). In some embodiments, the vector may be a matrix (i.e. an n×m vector where n>1 and m>1). For example, CIM module 1430 may include an analog static random access memory (SRAM) having multiple SRAM cells and configured to provide output(s) (e.g. voltage(s)) corresponding to the data (weight/parameter) stored in each cell of the SRAM multiplied by a corresponding element of the input vector. In some embodiments CIM module 1430 may include a digital static SRAM having multiple SRAM cells and configured to provide output(s) corresponding to the data (weight/parameter) stored in each cell of the digital SRAM multiplied by a corresponding element of the input vector. In some embodiments, CIM module 1430 may include an analog resistive random access memory (RAM) configured to provide output (e.g. voltage(s)) corresponding to the impedance of each cell multiplied by the corresponding element of the input vector. Other configurations of CIM module 1530 are possible. Each CIM module 1430 thus stores weights corresponding to a matrix in its cells and is configured to perform a vector-matrix multiplication of the matrix with an input vector.

In order to facilitate on-chip learning, LU module 1440 may be provided. LU module 1440 is coupled with the corresponding CIM module 1430. LU module 1440 is used to update the weights (or other data) stored in CIM module 1430. LU module 1440 is considered local because LU module 1440 is in proximity with CIM module 1430. For example, LU module 1440 may reside on the same integrated circuit as CIM module 1430. In some embodiments LU module 1440 for a particular compute engine resides in the same integrated circuit as the CIM module 1430. In some embodiments, LU module 1440 is considered local because it is fabricated on the same substrate (e.g. the same silicon wafer) as the corresponding CIM module 1430. In some embodiments, LU module 1440 is also used in determining the weight updates. In other embodiments, a separate component may calculate the weight updates. For example, in addition to or in lieu of LU module 1440, the weight updates may be determined by a GP processor, in software by other processor(s) not part of compute engine 1400 and/or the corresponding AI accelerator (e.g. compute tile 1100, 1200, or 1300), by other hardware that is part of compute engine 1400 and/or the corresponding AI accelerator (e.g. compute tile 1100, 1200, or 1300), by other hardware outside of compute engine 1400 or the corresponding AI accelerator (e.g. compute tile 1100, 1200, or 1300), and/or some combination thereof.

Using compute engine 1400 in the context of compute tiles 1100, 1200, or 1300 and/or an analogous system, efficiency and performance of a learning network may be improved. Use of CIM modules 1430 may dramatically reduce the time to perform the vector-matrix multiplication that provides the weighted signal. Thus, performing inference(s) using compute engine 1400 may require less time and power. This may improve efficiency of training and use of the model. LU modules 1440 allow for local updates to the weights in CIM modules 1430. This may reduce the data movement that may otherwise be required for weight updates. Consequently, the time taken for training may be greatly reduced. In some embodiments, the time taken for a weight update using LU modules 1440 may be an order of magnitude less (i.e. require one-tenth the time) than if updates are not performed locally. Efficiency and performance of a learning network provided using system 1100 may be increased.

Figure 14:
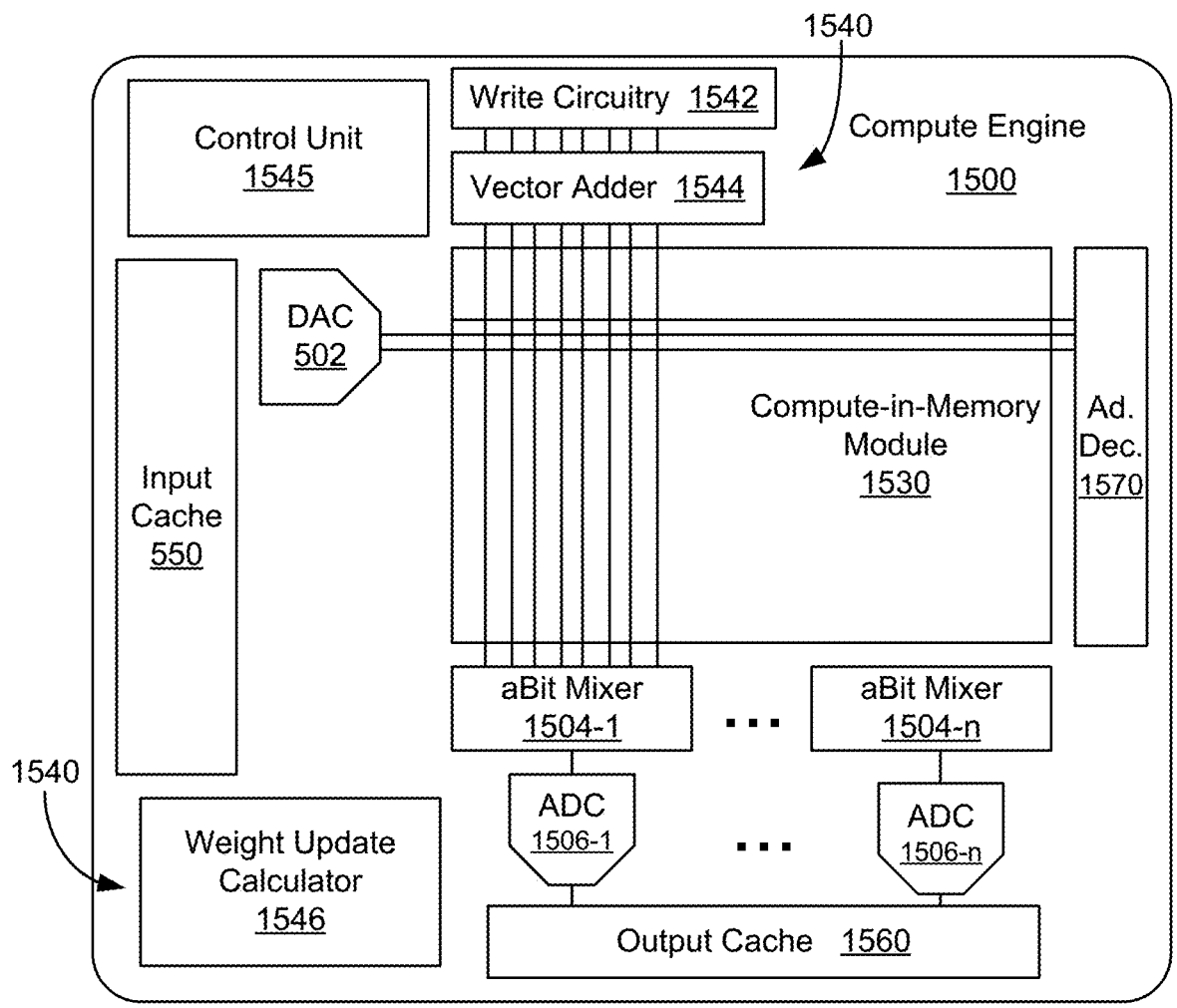
FIG. 14 depicts an embodiment of a portion of a compute engine usable in an accelerator for a learning network and capable of performing local updates.

FIG. 14 depicts an embodiment of compute engine 1500 usable in an AI accelerator and capable of performing local updates. Compute engine 1500 may be a hardware compute engine analogous to compute engine 1400. Compute engine 1500 thus includes CIM module 1530 and LU module 1540 analogous to CIM modules 1430 and LU modules 1440, respectively. Compute engine 1500 also includes analog bit mixer (aBit mixer) 1504-1 through 1504-n (generically or collectively 1504), analog to digital converter(s) (ADC(s)) 1506-1 through 1506-n (generically or collectively 1506), input cache 1550, output cache 1560, and address decoder 1570. Although particular numbers of components 1502, 1504, 1506, 1530, 1540, 1542, 1544, 1546, 1360, and 1570 are shown, another number of one or more components 1502, 1504, 1506, 1530, 1540, 1542, 1544, 1546, 1360, and 1570 may be present.

CIM module 1530 is a hardware module that stores data corresponding to weights and performs vector-matrix multiplications. The vector is an input vector provided to CIM module 1530 (e.g. via input cache 1550) and the matrix includes the weights stored by CIM module 1530. In some embodiments, the vector may be a matrix. Examples of embodiments CIM modules that may be used in CIM module 1530 are depicted in FIGS. 15 and 16.

Figure 15:
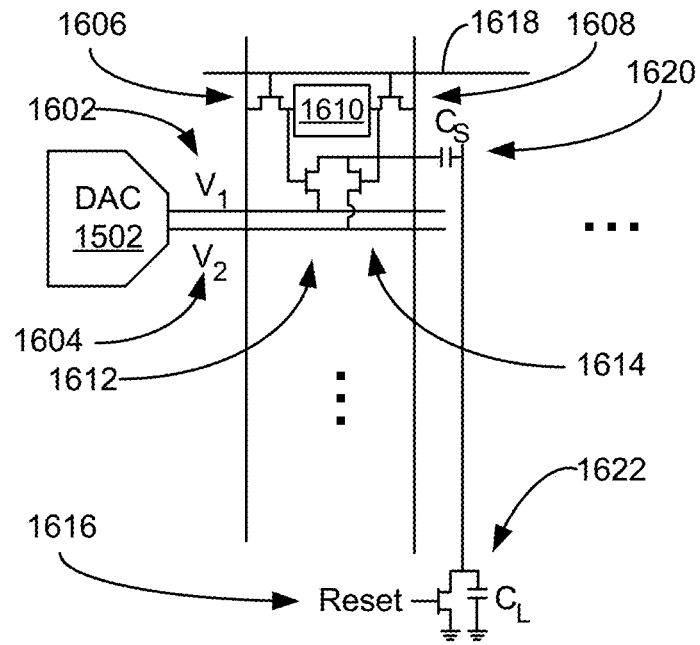
FIG. 15 depicts an embodiment of a portion of a compute-in-memory module usable in an accelerator for a learning network.

FIG. 15 depicts an embodiment of a cell in one embodiment of an SRAM CIM module usable for CIM module 1530. Also shown is DAC 1502 of compute engine 1500. For clarity, only one SRAM cell 1610 is shown. However, multiple SRAM cells 1610 may be present. For example, multiple SRAM cells 1610 may be arranged in a rectangular array. An SRAM cell 1610 may store a weight or a part of the weight. The CIM module shown includes lines 1602, 1604, and 1618, transistors 1606, 1608, 1612, 1614, and 1616, capacitors 1620 ($C_S$) and 1622 ($C_L$). In the embodiment shown in FIG. 15, DAC 1502 converts a digital input voltage to differential voltages, $V_1$ and $V_2$, with zero reference. These voltages are coupled to each cell within the row. DAC 1502 is thus used to temporal code differentially. Lines 1602 and 1604 carry voltages $V_1$ and $V_2$, respectively, from DAC 1502. Line 1618 is coupled with address decoder 1570 (not shown in FIG. 15) and used to select cell 1610 (and, in the embodiment shown, the entire row including cell 1610), via transistors 1606 and 1608.

In operation, voltages of capacitors 1620 and 1622 are set to zero, for example via Reset provided to transistor 1616. DAC 1502 provides the differential voltages on lines 1602 and 1604, and the address decoder (not shown in FIG. 15) selects the row of cell 1610 via line 1618. Transistor 1612 passes input voltage $V_1$ if SRAM cell 1610 stores a logical 1, while transistor 1614 passes input voltage $V_2$ if SRAM cell 1610 stores a zero. Consequently, capacitor 1620 is provided with the appropriate voltage based on the contents of SRAM cell 1610. Capacitor 1620 is in series with capacitor 1622. Thus, capacitors 1620 and 1622 act as capacitive voltage divider. Each row in the column of SRAM cell 1610 contributes to the total voltage corresponding to the voltage passed, the capacitance, $C_S$, of capacitor 1620, and the capacitance, $C_L$, of capacitor 1622. Each row contributes a corresponding voltage to the capacitor 1622. The output voltage is measured across capacitor 1622. In some embodiments, this voltage is passed to the corresponding aBit mixer 1504 for the column. In some embodiments, capacitors 1620 and 1622 may be replaced by transistors to act as resistors, creating a resistive voltage divider instead of the capacitive voltage divider. Thus, using the configuration depicted in FIG. 15, CIM module 1530 may perform a vector-matrix multiplication using data stored in SRAM cells 1610.

Figure 16:
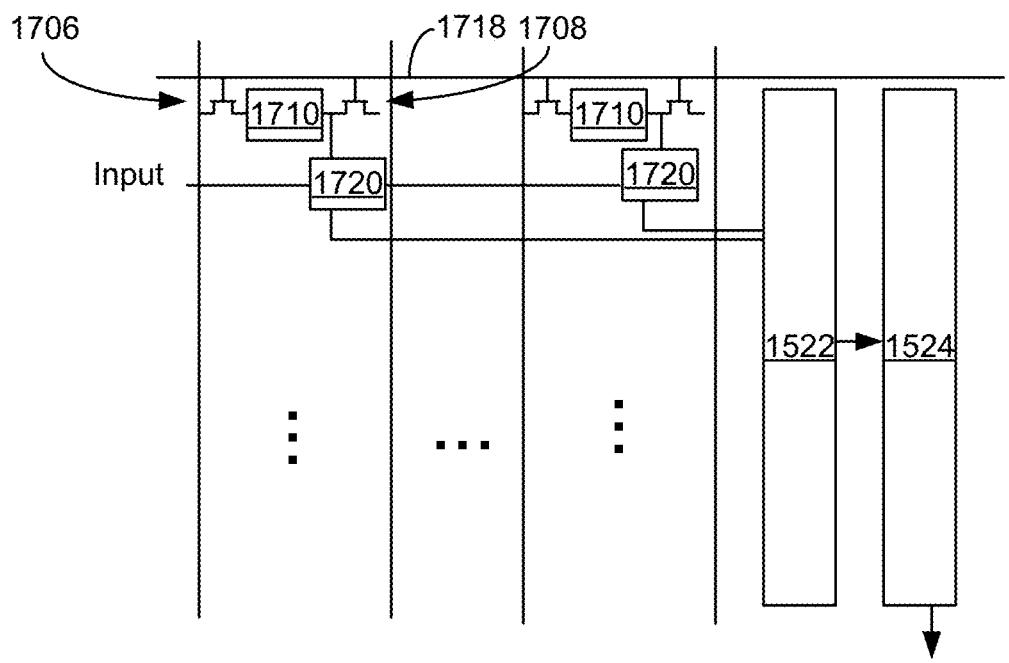
FIG. 16 depicts an embodiment of a portion of a compute-in-memory module usable in an accelerator for a learning network.

FIG. 16 depicts an embodiment of a cell in one embodiment of a digital SRAM module usable for CIM module 1530. For clarity, only one digital SRAM cell 1710 is labeled. However, multiple cells 1710 are present and may be arranged in a rectangular array. Also labeled are corresponding transistors 1706 and 1708 for each cell, line 1718, logic gates 1720, adder tree 1722 and digital mixer 1724. Because the SRAM module shown in FIG. 16 is digital, DACs 1502, aBit mixers 1504, and ADCs 1506 may be omitted from compute engine 1500 depicted in FIG. 14.

In operation, a row including digital SRAM cell 1710 is enabled by address decoder 1570 (not shown in FIG. 16) using line 1718. Transistors 1706 and 1708 are enabled, allowing the data stored in digital SRAM cell 1710 to be provided to logic gates 1720. Logic gates 1720 combine the data stored in digital SRAM cell 1710 with the input vector. Thus, the binary weights stored in digital SRAM cells 1710 are combined with the binary inputs. The output of logic gates 1720 are accumulated in adder tree 1722 and combined by digital mixer 1724. Thus, using the configuration depicted in FIG. 16, CIM module 1530 may perform a vector-matrix multiplication using data stored in digital SRAM cells 1710.

Referring back to FIG. 16, CIM module 1530 thus stores weights corresponding to a matrix in its cells and is configured to perform a vector-matrix multiplication of the matrix with an input vector. In some embodiments, compute engine 1500 stores positive weights in CIM module 1530. However, the use of both positive and negative weights may be desired for some models and/or some applications. In such cases, bipolar weights (e.g. having range $-S$ through $+S$) are mapped to a positive range (e.g. 0 through S). For example, a matrix of bipolar weights, W, may be mapped to a positive weight matrix $W_p$ such that: $Wx=(W_p-SJ/2)(2x)=15W_px-$ $S\Sigma_i x_i$. where J is a matrix of all ones having the same size as W and S is the maximum value of the weight (e.g. $12^{N-1}-1$ for an N-bit weight). For simplicity, compute engine 1500 is generally discussed in the context of CIM module 1530 being an analog SRAM CIM module analogous to that depicted in FIG. 15.

Input cache 1550 receives an input vector for which a vector-matrix multiplication is desired to be performed. In some embodiments, the input vector is provided to input cache by a GP processor, such as GP processor 1110. The input vector may be read from a memory, from a cache or register in the processor, or obtained in another manner. Digital-to-analog converter (DAC) 1502 converts a digital input vector to analog in order for CIM module 1530 to operate on the vector. Although shown as connected to only some portions of CIM module 1530, DAC 1502 may be connected to all of the cells of CIM module 1530. Alternatively, multiple DACs 1502 may be used to connect to all cells of CIM module 1530. Address decoder 1570 includes address circuitry configured to selectively couple vector adder 1544 and write circuitry 1542 with each cell of CIM module 1530. Address decoder 1570 selects the cells in CIM module 1530. For example, address decoder 1570 may select individual cells, rows, or columns to be updated, undergo a vector-matrix multiplication, or output the results. In some embodiments, aBit mixer 1504 combines the results from CIM module 1530. Use of aBit mixer 1504 may save on ADCs 1506 and allows access to analog output voltages.

ADC(s) 1506 convert the analog resultant of the vector-matrix multiplication to digital form. Output cache 1560 receives the result of the vector-matrix multiplication and outputs the result from compute engine 1500. Thus, a vector-matrix multiplication may be performed using CIM module 1530.

LU module 1540 includes write circuitry 1542 and vector adder 1544. In some embodiments, LU module 1540 includes weight update calculator 1546. In other embodiments, weight update calculator 1546 may be a separate component and/or may not reside within compute engine 1500. Weigh update calculator 1546 is used to determine how to update to the weights stored in CIM module 1530. In some embodiments, the updates are determined sequentially based upon target outputs for the learning system of which compute engine 1500 is a part. In some embodiments, the weight update provided may be sign-based (e.g. increments for a positive sign in the gradient of the loss function and decrements for a negative sign in the gradient of the loss function). In some embodiments, the weight update may be ternary (e.g. increments for a positive sign in the gradient of the loss function, decrements for a negative sign in the gradient of the loss function, and leaves the weight unchanged for a zerogradient of the loss function). Other types of weight updates may be possible. In some embodiments, weight update calculator 1546 provides an update signal indicating how each weight is to be updated. The weight stored in a cell of CIM module 1530 is sensed and is increased, decreased, or left unchanged based on the update signal. In particular, the weight update may be provided to vector adder 1544, which also reads the weight of a cell in CIM module 1530. More specifically, adder 1544 is configured to be selectively coupled with each cell of CIM module by address decoder 1570. Vector adder 1544 receives a weight update and adds the weight update with a weight for each cell. Thus, the sum of the weight update and the weight is determined. The resulting sum (i.e. the updated weight) is provided to write circuitry 1542. Write circuitry 1542 is coupled with vector adder 1544 and the cells of CIM module 1530. Write circuitry 1542 writes the sum of the weight and the weight update to each cell. In some embodiments, LU module 1540 further includes a local batched weight update calculator (not shown in FIG. 14) coupled with vector adder 1544. Such a batched weight update calculator is configured to determine the weight update.

Compute engine 1500 may also include control unit 1545. Control unit 1545 generates the control signals depending on the operation mode of compute engine 1500. Control unit 1545 is configured to provide control signals to CIM hardware module 1530 and LU module 1549. Some of the control signals correspond to an inference mode. Some of the control signals correspond to a training, or weight update mode. In some embodiments, the mode is controlled by a control processor (not shown in FIG. 14, but analogous to processor 1110) that generates control signals based on the Instruction Set Architecture (ISA).

In inference mode, the input data is multiplied by the stored weights and output is obtained after ADC 1506. This mode may include many steps. For example, if capacitors arranged in a voltage divider are used to provide the output (e.g. in FIG. 15), the capacitors (or other storage elements) may be reset. For example, capacitors are rest to either zero or certain precharge value depending on the functionality of the capacitor. Capacitive voltage divider operation is enabled to provide the output of the vector-matrix-multiplication. aBit mixer 1504 is enabled. ADC(s) 1506 are also enabled. Data are stored in output cache 1560 to be passed to the compute engine or other desired location(s). This process may be repeated for the entire vector multiplication. In weight update mode, the weight update signals may be generated sequentially by weight update calculator 1546. In parallel, cells in a row of CIM module 1530 are read row by row and passed to adder 1544 for the corresponding weight update.

Using compute engine 1500, efficiency and performance of a learning network may be improved. CIM module 1530 may dramatically reduce the time to perform the vector-matrix multiplication. Thus, performing inference(s) using compute engine 1500 may require less time and power. This may improve efficiency of training and use of the model. LU module 1540 uses components 1542, 1544, and 1546 to perform local updates to the weights stored in the cells of CIM module 1530. This may reduce the data movement that may otherwise be required for weight updates. Consequently, the time taken for training may be dramatically reduced. Efficiency and performance of a learning network provided using compute engine 1500 may be increased.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A compute engine, comprising:
an input buffer configured to store a vector, the vector including a vector sign; and
a plurality of compute-in-memory (CIM) hardware modules coupled with the input buffer, configured to store a plurality of weights corresponding to a matrix, and configured to perform a vector-matrix multiplication (VMM) for the matrix and the vector, each of the plurality of weights including a weight sign, the plurality of CIM hardware modules further including:
a plurality of storage cells for storing the plurality of weights; and a plurality of vector multiplication units (VMUs) coupled with the plurality of storage cells and the input buffer, each VMU of the plurality of VMUs configured to multiply, with the vector, at least a portion of a weight of a portion of the plurality of weights;

wherein a set of VMUs of the plurality of VMUs are configured to perform multiplications for a first weight length and a second weight length different from the first weight length such that each VMU of the set of VMUs performs the multiplications for both the first weight length and the second weight length, an indication of the vector sign being propagated to each VMU of the set of VMUs, the weight sign being propagated to a portion of the VMUs in the set of VMUs for the second weight length; and wherein each VMU in the portion of the VMUs is configured to extend the weight sign for a remaining portion of the VMU for the second weight length.

2. The compute engine of claim 1, wherein the set of VMUs includes a first VMU and a second VMU, the first VMU and the second VMU each being configured to perform the multiplications for the first weight length, the second weight length being twice the first weight length.

3. The compute engine of claim 1, further comprising:
a combiner coupled with the set of VMUs, the combiner configured to combine a product of the at least the portion of each weight and an element of the vector for the second weight length.

4. The compute engine of claim 3, wherein the combiner shifts the product for a first VMU of the set of VMUs by the first weight length relative to the product for a second VMU of the set of VMUs.

5. The compute engine of claim 1, wherein each element of the vector in the input buffer is serialized for the multiplications.

6. The compute engine of claim 1, wherein the first weight length corresponds to more significant bits of a weight and the second weight length corresponds to a combination of the more significant bits of the weight and less significant bits of the weight, the set of VMUs including a first VMU for the more significant bits of the weight and at least a second VMU for the less significant bits of the weight.

7. The compute engine of claim 1, wherein the compute engine has a first output precision for the first weight length and a second output precision for the second weight length, the second output precision being a multiple of the first output precision.

8. The compute engine of claim 1, wherein each VMU in the set of VMUs determines the multiplications using a lookup table.

9. The compute engine of claim 1, wherein the input buffer is configured to store non-vector data; and wherein the plurality of CIM hardware modules are configured to multiply the non-vector data with the matrix.

10. The compute engine of claim 1, wherein the plurality of VMUs are configured to perform multiplications for the first weight length only or the second weight length only for either a plurality of matrices or a plurality of vectors.

11. An accelerator, comprising:
a processor, and
a plurality of compute engines coupled with the processor, each of the plurality of compute engines including an input buffer configured to store a vector and a plurality of compute-in-memory (CIM) hardware modules, coupled with the input buffer, configured to store a plurality of weights corresponding to a matrix, and configured to perform a vector-matrix multiplication (VMM) for the matrix and the vector, the vector including a vector sign, each of the plurality of weights including a weight sign, the plurality of CIM hardware modules further including:
a plurality of storage cells for storing the plurality of weights;
a plurality of vector multiplication units (VMUs) coupled with the plurality of storage cells and the input buffer, each VMU of the plurality of VMUs configured to multiply, with the vector, at least a portion of a weight of a portion of the plurality of weights corresponding to a portion of the matrix;

wherein a set of VMUs of the plurality of VMUs are configured to perform multiplications for a first weight length and a second weight length different from the first weight length such that each VMU of the set of VMUs performs the multiplications for both the first weight length and the second weight length, an indication of the vector sign being propagated to each VMU of the set of VMUs, the weight sign being propagated to a portion of the VMUs in the set of VMUs for the second weight length; and wherein each VMU in the portion of the VMUs is configured to extend the weight sign for a remaining portion of the VMU for the second weight length.

12. A method, comprising:
providing a vector to a compute engine including a plurality of compute-in-memory (CIM) hardware modules configured to store a plurality of weights corresponding to a matrix and configured to perform a vector-matrix multiplication (VMM) for the matrix, the plurality of CIM hardware modules further including a plurality of storage cells and a plurality of vector matrix multiplication units (VMUs), the plurality of storage cells storing the plurality of weights, the plurality of VMUs coupled with the plurality of storage cells, each VMU of the plurality of VMUs configured to multiply, with the vector, at least a portion of each weight of a portion of the plurality of weights corresponding to a portion of the matrix, the vector including a vector sign and each of the plurality of weights including a weight sign; and performing a VMM of the vector and the matrix using the plurality of CIM hardware modules, a set of VMUs of the plurality of VMUs configured to perform multiplications for a first weight length and a second weight length different from the first weight length such that each VMU of the set of VMUs is capable of performing the multiplications for both the first weight length and the second weight length, the performing the VMM further including:
propagating an indication of the vector sign to each VMU of the set of VMUs;
propagating the weight sign to a portion of the VMUs in the set of VMUs for the second weight length; and
in each VMU of the portion of the VMUs, extending the weight sign for a remaining portion of the VMU for the second weight length.

13. The method of claim 12, wherein the set of VMUs includes a first VMU and a second VMU, the first VMU and the second VMU each being configured to perform the multiplications for the first weight length, the second weight length being twice the first weight length.

14. The method of claim 12, further comprising:
combining a product of the portion of each weight and an element of the vector for the second weight length.

15. The method of claim 14, wherein the combining further includes:
  shifting the product for a first VMU of the set of VMUs by the first weight length relative to the product for a second VMU of the set of VMUs.

16. The method of claim 12, wherein the providing the vector further includes:
  serializing each element of the vector.

* * * * *